（12）United States Patent
Lee et al.

(10) Patent No.: US 11,947,744 B2
(45) Date of Patent: Apr. 2, 2024

(54) DEVICE FOR PROVIDING AUGMENTED REALITY AND METHOD FOR PROVIDING AUGMENTED REALITY USING THE SAME

(71) Applicant: Samsung Display Co., LTD., Yongin-si (KR)

(72) Inventors: Tae Hee Lee, Hwaseong-si (KR); Byung Choon Yang, Seoul (KR); Joo Woan Cho, Seongnam-si (KR); Byeong Hwa Choi, Seoul (KR); Hae Yun Choi, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/870,723

(22) Filed: Jul. 21, 2022

(65) Prior Publication Data

US 2023/0067456 A1　Mar. 2, 2023

(30) Foreign Application Priority Data

Sep. 2, 2021　(KR) .................. 10-2021-0116809

(51) Int. Cl.
*G06F 3/0354*　　(2013.01)
*G02B 27/00*　　(2006.01)
(Continued)

(52) U.S. Cl.
CPC ..... *G06F 3/03545* (2013.01); *G02B 27/0093* (2013.01); *G02B 27/017* (2013.01);
(Continued)

(58) Field of Classification Search
CPC ............. G02B 27/0093; G02B 27/017; G02B 27/0176; G02B 2027/0138;
(Continued)

(56) References Cited

U.S. PATENT DOCUMENTS 10,937,215 B1 *　3/2021　Iskandar ................. G06F 3/011
11,232,643 B1 *　1/2022　Stevens .................... G06F 3/014
(Continued)

FOREIGN PATENT DOCUMENTS

KR　10-2017-0096420 A　8/2017
KR　10-2018-0118488 A　10/2018

*Primary Examiner* — Nelson M Rosario
(74) *Attorney, Agent, or Firm* — Lewis Roca Rothgerber Christie LLP

(57) ABSTRACT

The present disclosure relates to a device for providing augmented reality that can accurately recognize a writing tool such as an electronic pen to realize motion information of the writing tool over augmented reality contents, and a method for providing augmented reality using the same. According to some embodiments of the disclosure, an augmented reality device includes at least one transparent lens, a support frame supporting the at least one transparent lens, at least one display module configured to display augmented reality contents through the at least one transparent lens, a sensing module at a front of the support frame, and configured to generate image data, and a control module configured to receive motion-sensing signals of an electronic pen to detect motion information of the electronic pen, and configured to modulate the augmented reality contents so that the motion information of the electronic pen is includes therein.

20 Claims, 22 Drawing Sheets

(51) Int. Cl.
    *G02B 27/01*  (2006.01)
    *G06F 3/01*  (2006.01)
    *G06F 3/038*  (2013.01)
    *G06T 19/00*  (2011.01)
    *H04W 4/80*  (2018.01)

(52) U.S. Cl.
    CPC ............ *G06F 3/013* (2013.01); *G06F 3/0383* (2013.01); *G06T 19/006* (2013.01); *H04W 4/80* (2018.02); *G02B 2027/0178* (2013.01)

(58) Field of Classification Search
    CPC . G02B 2027/0178; G06F 3/005; G06F 3/011; G06F 3/012; G06F 3/013; G06F 3/0346; G06F 3/03545; G06F 3/0383; G06F 3/0425; G06T 19/006; H04W 4/80
    See application file for complete search history.

(56) References Cited

U.S. PATENT DOCUMENTS

| | | | |
|---|---|---|---|
| 11,334,212 B2* | 5/2022 | Ravasz | G06V 40/20 |
| 2017/0309698 A1 | 10/2017 | Bower et al. | |
| 2019/0025588 A1* | 1/2019 | Osterhout | H04N 23/60 |

\* cited by examiner (GI×10,000)

(PI×10,000)

DEVICE FOR PROVIDING AUGMENTED REALITY AND METHOD FOR PROVIDING AUGMENTED REALITY USING THE SAME

CROSS-REFERENCE TO RELATED APPLICATION

This application claims priority to, and the benefit of, Korean Patent Application No. 10-2021-0116809 filed on Sep. 2, 2021 in the Korean Intellectual Property Office, the contents of which in its entirety are herein incorporated by reference.

BACKGROUND

1. Field

The present disclosure relates to a device for providing augmented reality, and a method for providing augmented reality using the device.

2. Description of the Related Art

Recently, as electronic devices and display devices capable of realizing virtual reality (VR) have been developed, such devices are attracting more and more attention. As the next step of virtual reality, a technology capable of realizing augmented reality (AR) and mixed reality (MR) is being studied.

Unlike virtual reality, which creates a completely virtual world, augmented reality is a display technology that further increases the effect of reality by providing an image that superimposes virtual objects or image information over an image of the environment of the real world.

While applications of virtual reality have been generally limited only to fields like games and virtual experiences, augmented reality advantageously finds a variety of applications that can be applied to the real environment in various ways. For example, augmented reality is attracting attention as a next-generation display technology suitable for a ubiquitous environment or an Internet of things (IoT) environment. Such augmented reality can be said to be an example of mixed reality in that it shows the real world as well as additional information of the virtual world.

SUMMARY

Aspects of the present disclosure provide a device for providing augmented reality that can accurately recognize a writing tool, such as an electronic pen, to realize motion information of the writing tool over augmented reality contents, and a method for providing augmented reality using the same.

Aspects of the present disclosure also provide a device for providing augmented reality that can match motion information of a writing tool appropriately for characteristics of augmented reality contents, and a method for providing augmented reality using the same.

It should be noted that aspects of the present disclosure are not limited to the above-mentioned aspect, and other aspects of the present disclosure will be apparent to those skilled in the art from the following descriptions.

According to some embodiments of the disclosure, there is provided an augmented reality device including at least one transparent lens, a support frame supporting the at least one transparent lens, at least one display module configured to display augmented reality contents through the at least one transparent lens, a sensing module at a front of the support frame, and configured to generate image data, and a control module configured to receive motion-sensing signals of an electronic pen to detect motion information of the electronic pen, and configured to modulate the augmented reality contents so that the motion information of the electronic pen is includes therein.

At least one display module may be assembled on at least one side of the support frame, or formed integrally with the support frame, and may be configured to display an image of the augmented reality contents through an image transmission member and at least one reflective member of the transparent lens.

The sensing module may be assembled on the support frame, or formed integrally with the support frame, may be configured to detect a distance to an object using a depth sensor and an image sensor, and may be configured to detect a user's eye or pupil movement using at least one biosensor.

The control module may be configured to divide image data in front of the sensing module into block areas, and may be configured to identify coordinates of the user's gaze point based on analysis results of pupil-sensing signals of the at least one biosensor, wherein the control module is configured to detect the electronic pen in an image of the block areas associated with the coordinates of a user's gaze point to transmit a drawing start signal to the electronic pen.

The control module may supply augmented reality contents data to the at least one display module so that the at least one display module displays an image of the augmented reality contents, and upon receiving motion-sensing signals from the electronic pen in response to the drawing start signal, modulates the augmented reality contents data so that the motion information of the electronic pen is superimposed on the image of the augmented reality contents.

The control module may be configured to analyze the motion-sensing signals of the electronic pen to calculate location coordinate information of the electronic pen, and is configured to generate moving path data of the electronic pen by connecting the location coordinate information of the electronic pen, wherein the control module is configured to writes the moving path data of the electronic pen into the augmented reality contents data to modulate the augmented reality contents data, and is configured to transmit the augmented reality contents data to the at least one display module and to at least one contents display device.

The at least one contents display device may be configured to display the augmented reality contents data shared from the control module on a screen, and may be configured to display the augmented reality contents data substantially concurrently with the at least one display module upon receiving the modulated augmented reality contents data.

The electronic pen may include a housing in a form of a writing tool, a motion detection module in the housing and configured to generate the motion-sensing signals, at least one interface module configured to generate a drawing start signal or a drawing stop signal according to user input information, and a short-range communications module configured to transmit the motion-sensing signals via wireless communications, or configured to receive the drawing start signal or a drawing stop signal through the control module.

The control module may include a first wireless communications unit configured to receive the motion-sensing signals from the electronic pen, and configured to transmit a drawing start signal to the electronic pen, a location-information-calculating unit configured to calculate location coordinate information pieces of the electronic pen using the motion-sensing signals, an image-processing unit configured to detect a period of time in which a user gazes at the electronic pen, and configured to generate moving path data of the electronic pen by connecting the location coordinate information pieces of the electronic pen, a data-correcting unit configured to modulate augmented reality contents data corresponding to the augmented reality contents to include the moving path data therein, an image display control unit configured to control the at least one display module so that the augmented reality contents data is displayed through the at least one display module and the transparent lens, and a second wireless communications unit configured to transmit the augmented reality contents data to at least one external contents display device.

The location-information-calculating unit may be configured to receive the motion-sensing signals including an acceleration signal, an angular velocity signal, and a tilt signal that vary as the electronic pen moves in an x-axis direction, a y-axis direction, and a z-axis direction, and is configured to calculate an x-axis coordinate, a y-axis coordinate, and a z-axis coordinate according to changes in distance, speed, and tilt of the electronic pen.

The image-processing unit may be configured to divide image data corresponding to a front side of the sensing module into block areas, and is configured to detect coordinates of a user's gaze point based on matrix arrangement information of infrared sensors included in the sensing module and based on movement analysis results of pupil-sensing signals according to the matrix arrangement information, wherein the image-processing unit detects the electronic pen in an image of the block areas associated with coordinates of the user's gaze point to transmit a drawing start signal to the electronic pen through the first wireless communications unit.

The image-processing unit may be configured to detect an image of a shape of the electronic pen based on at least one of results of analyzing a grayscale or luminance difference between pixels of respective ones of the block areas associated with the coordinates of the user's gaze point, and based on comparing pixel data with a mask in a form of an electronic pen.

The image-processing unit may be configured to calculate distance information between the sensing module and the electronic pen based on a distance-sensing signal from the sensing module when the electronic pen is detected in the image of the block areas, and may be configured to transmit the drawing start signal to the electronic pen through the first wireless communications unit when the distance information indicating a distance between the sensing module and the electronic pen is less than or equal to reference distance information.

The image-processing unit may store an x-axis coordinate, a y-axis coordinate, and a z-axis coordinate of the electronic pen calculated from the location-information-calculating unit in coordinate writing space data or block data of a size of the augmented reality contents to thereby generate the moving path data of the electronic pen.

The image-processing unit may be configured to correct a size and a resolution of the moving path data of the electronic pen so as to correspond to size and resolution characteristics of each frame of the augmented reality contents data, and is configured to transmit the size and the resolution to the data-correcting unit.

The data-correcting unit may be configured to separately store the augmented reality contents data frame by frame, and is configured to sequentially write the moving path data of the electronic pen with modulated size and resolution characteristics into the augmented reality contents data items to modulate the augmented reality contents data.

According to some embodiments of the disclosure, there is provided a method for providing augmented reality, the method including displaying augmented reality contents through at least one display module and a transparent lens, generating a drawing start signal, transmitting the drawing start signal to an electronic pen, receiving motion-sensing signals from the electronic pen, calculating location coordinate information pieces of the electronic pen using the motion-sensing signals, generating moving path data of the electronic pen by connecting the location coordinate information pieces, modulating augmented reality contents data corresponding to the augmented reality contents so that the moving path data is included therein, displaying the augmented reality contents data on the at least one display module, and transmitting the augmented reality contents data to at least one external contents display device.

The generating the drawing start signal may include detecting image data in front of a device, providing augmented reality to divide the image data into block areas, detecting coordinates of a user's gaze point based on matrix arrangement information of infrared sensors included in at least one biosensor for detecting a pupil, and based on results of analyzing movement of pupil-sensing signals according to the matrix arrangement information, detecting the electronic pen in an image of one or more of the block areas associated with the coordinates of the user's gaze point, generating a drawing start signal, and transmitting the drawing start signal to the electronic pen.

The generating the moving path data of the electronic pen may include storing an x-axis coordinate, a y-axis coordinate, and a z-axis coordinate of the electronic pen in coordinate writing space data or block data of a size of augmented reality contents, and correcting a size and a resolution of a moving path data of the electronic pen in which the x-axis coordinate, the y-axis coordinate, and the z-axis coordinate of the electronic pen are arranged to correspond to size and resolution characteristics of each frame of the augmented reality contents.

The modulating the augmented reality contents data may include dividing and storing the augmented reality contents data frame by frame, storing the moving path data of the electronic pen in which the size and resolution characteristics are modulated, and sequentially writing, modulating, and storing the moving path data of the electronic pen with the size and resolution characteristics modulated into the augmented reality contents data.

According to some embodiments of the present disclosure, it is possible to accurately realize motion information of a writing tool, such as an electronic pen, on augmented reality contents, thereby increasing the usability of the device for providing augmented reality.

According to some embodiments of the present disclosure, it is possible to match motion characteristics of an electronic pen appropriately for augmented reality characteristics, thereby increasing the display quality and reliability of the augmented reality contents.

It should be noted that aspects of the present disclosure are not limited to those described above and other aspects of the present disclosure will be apparent to those skilled in the art from the following descriptions.

BRIEF DESCRIPTION OF THE DRAWINGS

The above and other aspects of the present disclosure will become more apparent by describing in detail embodiments thereof with reference to the attached drawings, in which.

DETAILED DESCRIPTION

Figure 1:
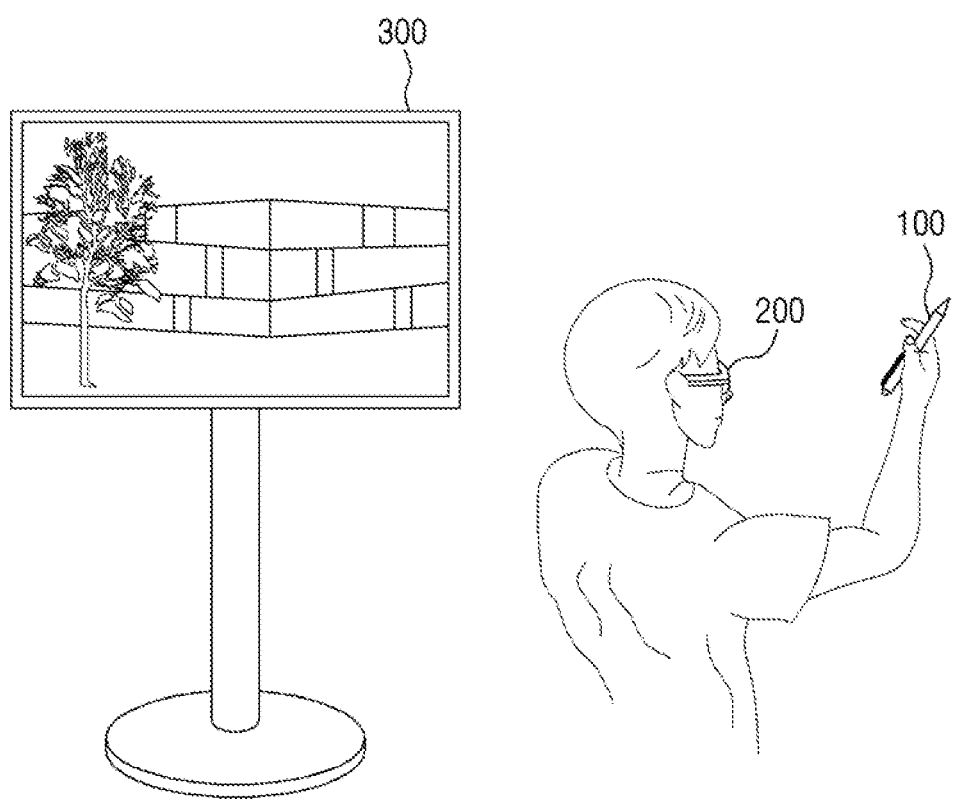
FIG. 1 is a view showing a display device for providing augmented reality (e.g., an AR device) according to some embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, "or" generally means "and/or," and the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware, to process data or digital signals. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Circuit hardware may include, for example, application specific integrated circuits (ASICs), general purpose or special purpose central processing units (CPUs) that is configured to execute instructions stored in a non-transitory storage medium, digital signal processors (DSPs), graphics processing units (GPUs), and programmable logic devices such as field programmable gate arrays (FPGAs).

Further, the various components of these devices may be a process or thread, running on one or more processors, in one or more computing devices, executing computer program instructions and interacting with other system components for performing the various functionalities described herein. The computer program instructions are stored in a memory that may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a view showing a display device for providing augmented reality (e.g., an AR device) according to some embodiments of the present disclosure.

Referring to FIG. 1, an AR device 200 may detect motion information of an electronic pen 100, which may be used as a writing tool or a laser pointer, and may display the motion information of the electronic pen 100 together with augmented reality contents. The augmented reality contents according to the motion information of the electronic pen 100 may be displayed in the same manner on at least one other content display device 300, such as a tablet personal computer (PC).

The electronic pen 100 may be employed as a digitizer pen that is used as a writing tool in an electronic device, such as a tablet PC, a smart phone, and an ultra-mobile PC (UMPC), or a pointer pen that generates motion-sensing signals using motion detection sensors. The electronic pen 100 may generate and transmit motion-sensing signals using motion detection sensors such as an acceleration sensor, a gyro sensor and a tilt sensor. The electronic pen can be utilized as a writing tool when it is used for an electronic device having a writing surface, such as a tablet PC, a smart phone and a UMPC. In addition, the electronic pen 100 can be used as a pointer for indicating a target when it is used with a large projection or a flat panel display device, or for a wearable device, such as a glasses type display device and a head mounted display (HMD).

The AR device 200 may be formed integrally with a frame in the form of glasses that a user can suitably carry and put on/take off. The AR device 200 may be configured so that it can be mounted or assembled on the glasses-type frame. The AR device 200 provides the augmented reality contents to a user's eyes through a transparent lens, so that the image of the augmented reality contents is superimposed on the real image seen by the user's eyes through the transparent lens. The augmented reality contents may be two-dimensional or three-dimensional image contents in which a graphic image, a captured image, text, etc. are combined.

The AR device 200 may further include at least one display module for displaying images of the augmented reality contents, and optical members for changing the display paths (or the light paths) of images of the augmented reality contents, so that the images of the augmented reality contents displayed on the at least one display module can be perceived by the user's eyes.

The AR device 200 superimposes images of augmented reality contents on a real image seen by the user's eyes, and receives motion-sensing signals of the electronic pen 100 from the electronic pen 100 that the user is using. In addition, the AR device 200 analyzes the motion-sensing signals of the electronic pen 100 to detect and track motion information of the electronic pen 100, and modulates augmented reality contents data so that the motion information of the electronic pen 100 is written into, and displayed on, the augmented reality contents displayed through the display module. In this manner, the AR device 200 can display the modulated augmented reality contents data so that the motion information of the electronic pen 100 is superimposed and displayed through the display module. In addition, the AR device 200 may transmit the modulated augmented reality contents data to at least one contents display device 300, which is an external device, and may share the data therewith.

The at least one contents display device 300 may display augmented reality contents shared with, and received from, the AR device 200, for example, an augmented reality contents image (e.g., an augmented image) on the screen. When the modulated augmented reality contents data is received from the AR device 200, the at least one contents display device 300 displays the modulated augmented image on the screen, such that the motion information of the electronic pen 100 is superimposed thereover. In other words, the at least one contents display device 300 may display the augmented reality contents data shared therewith on the screen thereof. In addition, when the modulated augmented reality contents data is received from the AR device 200, the modulated augmented reality contents data may be displayed on the screen simultaneously or substantially concurrently with the AR device 200.

The at least one contents display device 300 may be applied to tablet mobile communications devices, such as smartphone and a tablet PC, a personal digital assistant (PDA), a portable multimedia player (PMP), a television set, a game machine, a wristwatch-type electronic device, a head-mounted display, a monitor of a personal computer, a laptop computer, flat-panel video display device, a car navigation system, a car instrument cluster, a digital camera, a camcorder, an outdoor billboard, an electronic billboard, a medical apparatus, a test device, various home appliances such as a refrigerator and a laundry machine, Internet of things (IoT) devices, etc. Herein, a flat-panel video display device used for learning or lectures is described as an example of the contents display device 300. The flat-panel video display device may have a high resolution or ultra-high resolution such as HD, UHD, 4K, and 8K.

The flat-panel video display device used as the at least one contents display device 300 may be sorted by the display manner into an organic light-emitting display device (OLED), an inorganic light-emitting display device (inorganic EL), a quantum-dot light-emitting display device (QED), a micro LED display device (micro-LED), a nano LED display device (nano-LED), a plasma display device (PDP), a field emission display device (FED), a cathode ray display device (CRT), a liquid-crystal display device (LCD), an electrophoretic display device (EPD), etc. In the following description, a micro LED display device will be described as an example of the contents display device 300. The micro LED display device will be simply referred to as a display device unless it is suitable to discern them. It should be understood, however, that the embodiments of the present disclosure are not limited to the micro LED display devices, and any other contents display device listed above or well known in the art may be employed without departing from the scope of the present disclosure.

Figure 2:
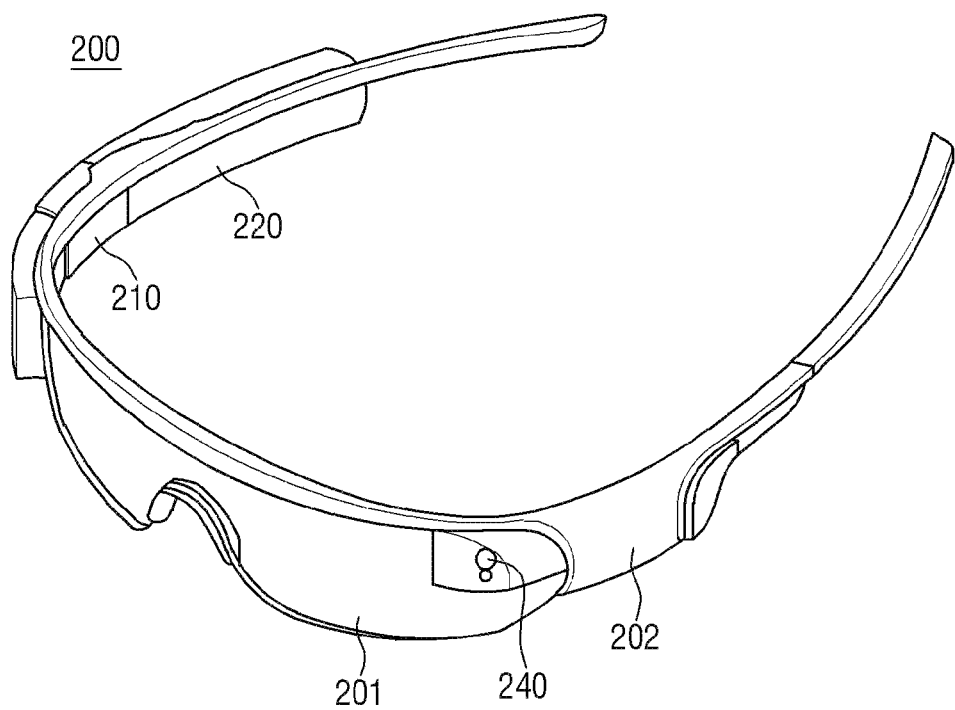
FIG. 2 is a perspective view showing the AR device shown in FIG. 1.
Figure 3:
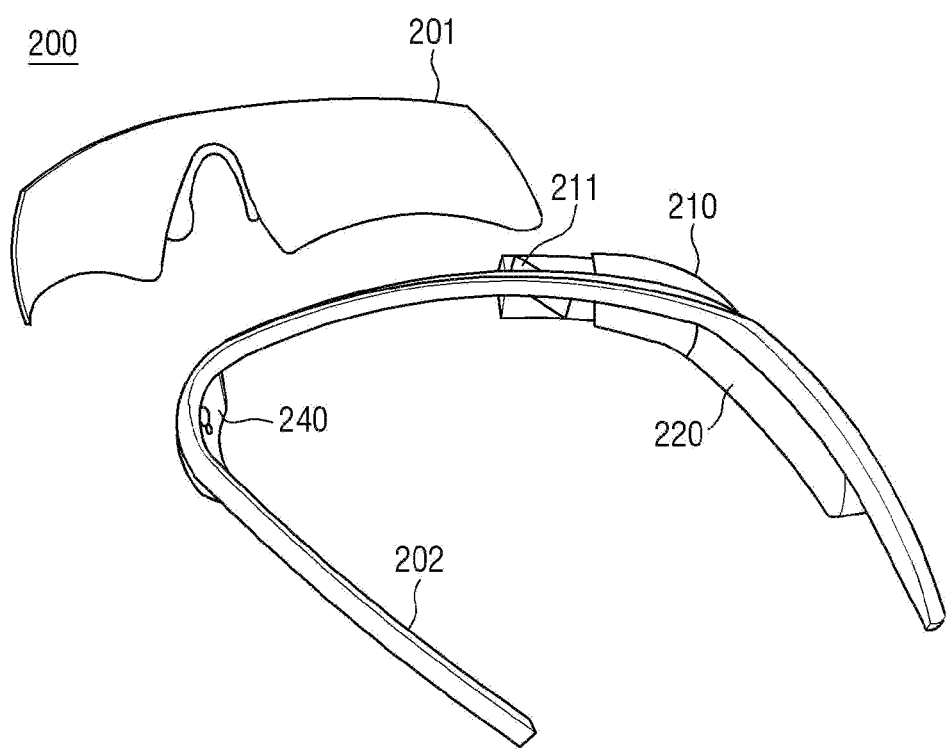
FIG. 3 is an exploded perspective view of the AR device shown in FIG. 2 when viewed from the rear side.
Figure 4:
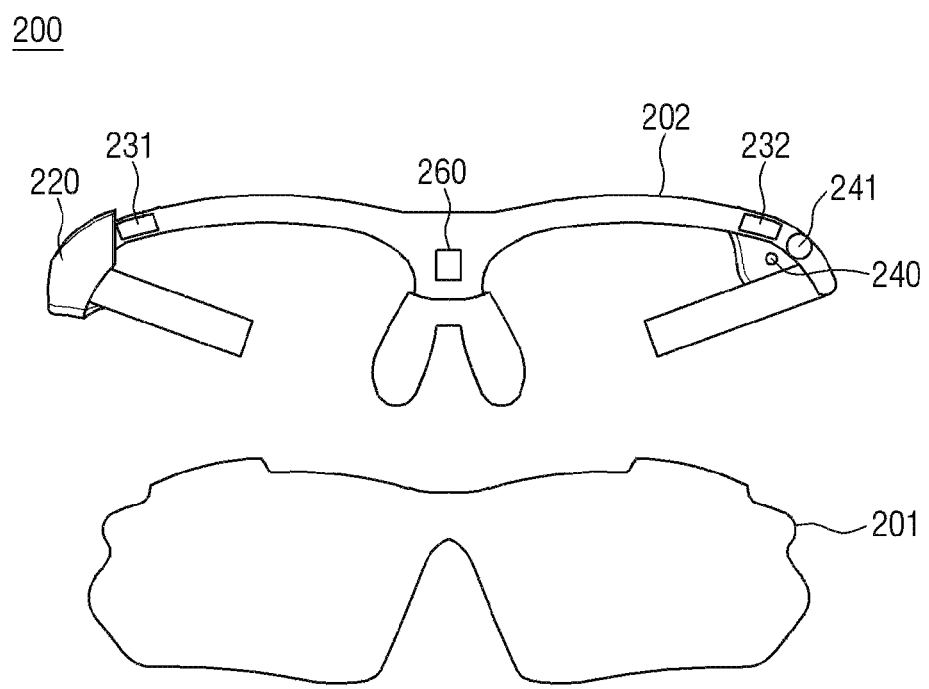
FIG. 4 is an exploded perspective view of the AR device shown in FIGS. 2 and 3 when viewed from the front side.

FIG. 2 is a perspective view showing the AR device according to the embodiments corresponding to FIG. 1. FIG. 3 is an exploded perspective view of the AR device shown in FIG. 2 when viewed from the rear side. FIG. 4 is an exploded perspective view of the AR device shown in FIGS. 2 and 3 when viewed from the front side.

Referring to FIGS. 2 to 4, the AR device 200 includes a support frame 202 supporting at least one transparent lens 201, at least one display module 210, a sensing module 240, and a control module 220.

The support frame 202 may be implemented in a glasses-like shape including a frame for supporting the edges of the at least one transparent lens 201 and temples. The shape of the support frame 202 is not limited to a glasses type, but may be formed in a goggles type or a head mountain type including a transparent lens.

The transparent lens 201 may have the left and right parts formed integrally, or may have a first transparent lens and a second transparent lens formed separately. The transparent lens 201 having the left and right parts formed integrally or the first and second transparent lenses formed separately may be made of glass or plastic to be transparent or translucent. Accordingly, the user can see the image of the real world through the transparent lens 201, which has the left and right parts formed integrally, or has the first and second transparent lenses formed separately. The transparent lens 201, which is either the integrated parts or the separated first and second transparent lenses, may have refractive power in consideration of the user's eyesight (e.g., the transparent lens 201 may correspond to corrective lenses).

The transparent lens 201 may further include at least one reflective member for reflecting the augmented image, which is provided from the at least one display module 210, toward the user's eyes. The at least one reflective member may be incorporated into the transparent lens 201 as a part thereof, and may be formed as a plurality of refractive lenses or as a plurality of prisms having a curvature (e.g., a predetermined curvature).

The at least one display module 210 for displaying the augmented image may be assembled on one side or both sides of the support frame 202, or may be formed integrally with the support frame 202. The at least one display module 210 displays the augmented image through the reflective members of an image transmission member 211 and the transparent lens 201. The image transmission member 211 may include a translucent optical waveguide (e.g., a prism) that reflects or transmits the augmented image provided from the display module 210 toward the at least one transparent lens 201. Accordingly, the augmented image displayed through the at least one display module 210 may be provided to the user's eyes through the reflective members of the transparent lens 201 via the optical waveguide of the image transmission member 211.

The at least one display module 210 may include a micro LED display device (micro-LED), a nano LED display device (nano-LED), an organic light-emitting display device (OLED), an inorganic light-emitting display device (inorganic EL), a quantum-dot light-emitting display device (QED), a cathode ray display device (CRT), a liquid-crystal display device (LCD), etc. In the following description, a micro LED display device is included in the display module 210. The micro LED display device will be simply referred to as a display device unless it is suitable to discern them. It should be understood, however, that the embodiments of the present disclosure are not limited to the micro LED display devices, and any other display device listed above or well known in the art may be employed without departing from the scope of the present disclosure.

The sensing module 240 is assembled to, or formed integrally with, the support frame 202, and senses the distance (or depth) to an object with respect to the front side of the support frame 202, and also senses the illuminance, the moving direction of the support frame 202, the moving distance, tilt, etc. To this end, the sensing module 240 may include: a depth sensor 241, such as an infrared sensor or a LiDar sensor; an image sensor 260, such as a camera; and at least one motion sensor of an illuminance sensor, a human body sensor, a gyro sensor, a tilt sensor, and an acceleration sensor. In addition, the sensing module 240 may sense motion information of the user's eyes or pupils. To this end, the sensing module 240 may include first and second biosensors 231 and 232 for sensing the movement of the user's eyes or pupils.

The first and second biosensors 231 and 232 are located on the inner side of the support frame 202 facing the user's eyes, and include at least one infrared light source and at least one infrared camera. The at least one infrared light source outputs infrared rays, and the at least one infrared camera detects infrared rays reflected off eyeballs or pupils as subjects. The at least one infrared light source may be configured as an infrared LED array having a matrix structure. In addition, the infrared camera may include a filter that transmits infrared rays and that blocks wavelength ranges other than infrared rays, a lens system for focusing the infrared rays transmitted the filter, and an optical image sensor that converts the optical image formed by the lens system into an electrical image signal and that outputs the electrical image signal, etc. Like the infrared LED array, the optical image sensor may be implemented as an array in a matrix form.

The sensing module 240 transmits sensing signals generated through the depth sensor 241 and at least one motion sensor to the control module 220 in real time. In addition, the image sensor 260 transmits image data within at least one frame generated in real time to the control module 220. The first and second biosensors 231 and 232 of the sensing module 240 transmit detected pupil-sensing signals to the control module 220.

The control module 220 may be assembled to at least one side of the support frame 202 together with the at least one display module 210, or may be integrally formed with the support frame 202. The control module 220 supplies the augmented reality contents data to the at least one display module 210 so that the at least one display module 210 displays the augmented reality contents, for example, the augmented image. At the same time, the control module 220 receives sensing signals, image data (also referred to as image data items, and pupil-sensing signals from the sensing module 240 in real time.

The control module 220 detects motion information of the AR device 200 through sensing signals from the sensing module 240 and image data items from the image sensor 260, and obtains image data on the front side to save them. Then, the control module 220 identifies the coordinates of the user's gaze point based on the changes in the pupil-sensing signals according to the matrix and the analysis results of the pupil-sensing signals. Accordingly, the control module 220 divides the image data on the front side of the AR device 200 into a plurality of block areas (e.g., predetermined block areas), analyzes the image of the divided block areas associated with the coordinates of the user's gaze point, and detects the electronic pen 100.

When the electronic pen 100 is detected in the image of the divided block areas associated with the coordinates of the user's gaze point, or when a drawing start signal pursuant to user control is input, the control module 220 receives motion-sensing signals from the electronic pen 100 used by the user.

The control module 220 analyzes the motion-sensing signals input from the electronic pen 100 in real time to continuously calculate the location coordinate information of the electronic pen 100, and generates moving path data by connecting the location coordinate information of the electronic pen 100. The control module 220 modulates the augmented reality contents data so that moving path data of the electronic pen 100 generated in real time is written into the augmented reality contents data, and supplies the modulated augmented reality contents data to the at least one display module 210. In addition, the control module 220 may transmit the modulated augmented reality contents data to at least one external contents display device 300.

Figure 5:
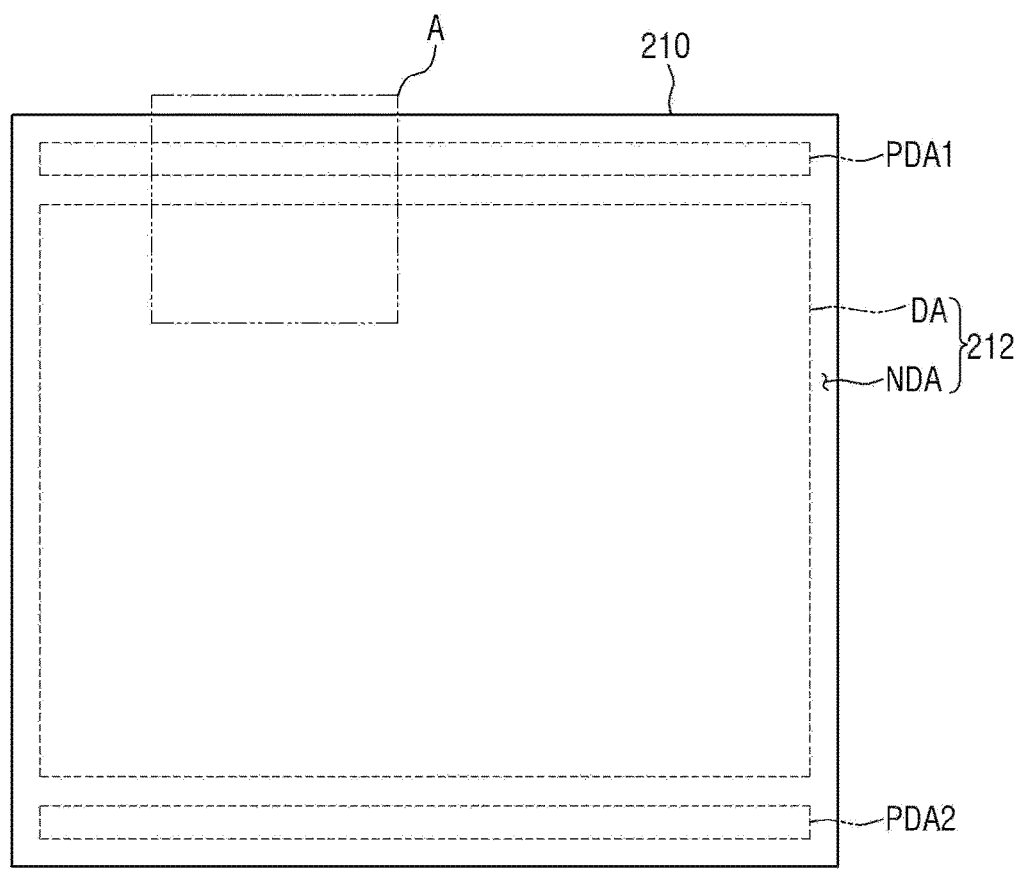
FIG. 5 is a layout diagram showing in detail a display module of the AR device shown in FIG. 2.
Figure 5:
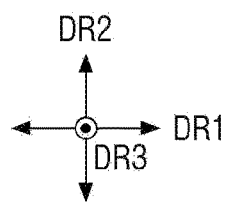
Figure 6:
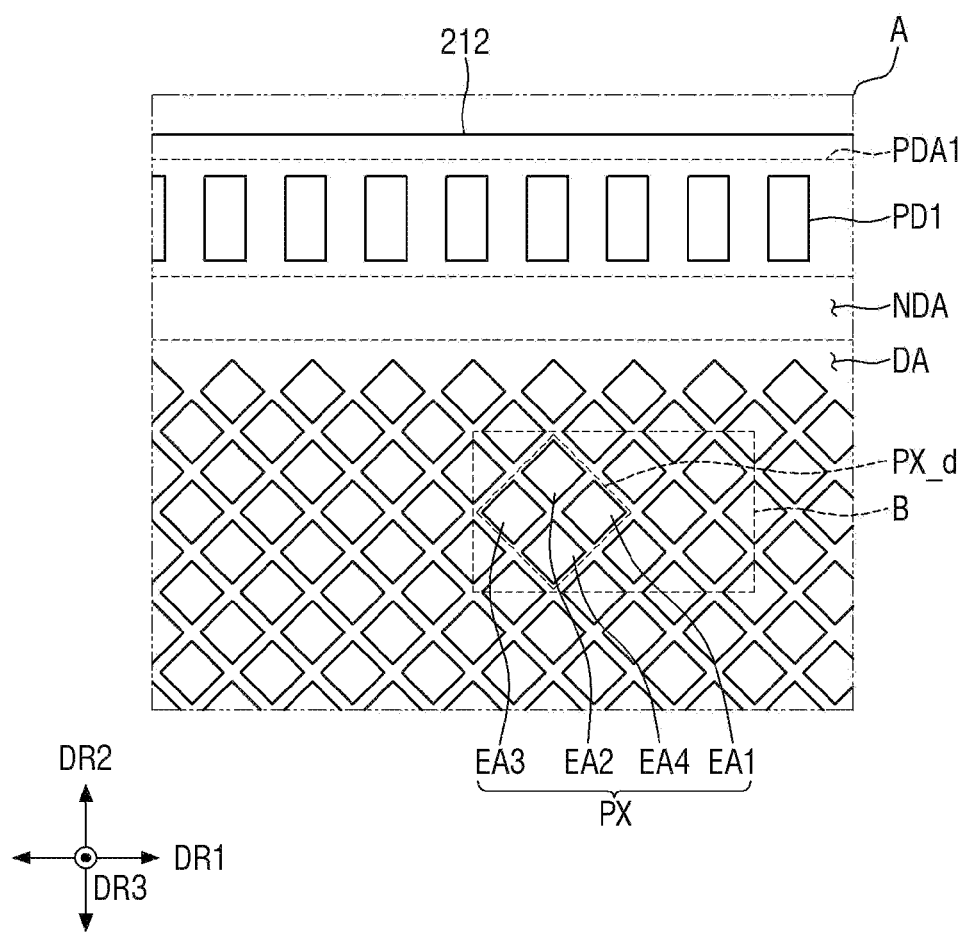
FIG. 6 is a layout diagram showing in detail area A of FIG. 5.
Figure 7:
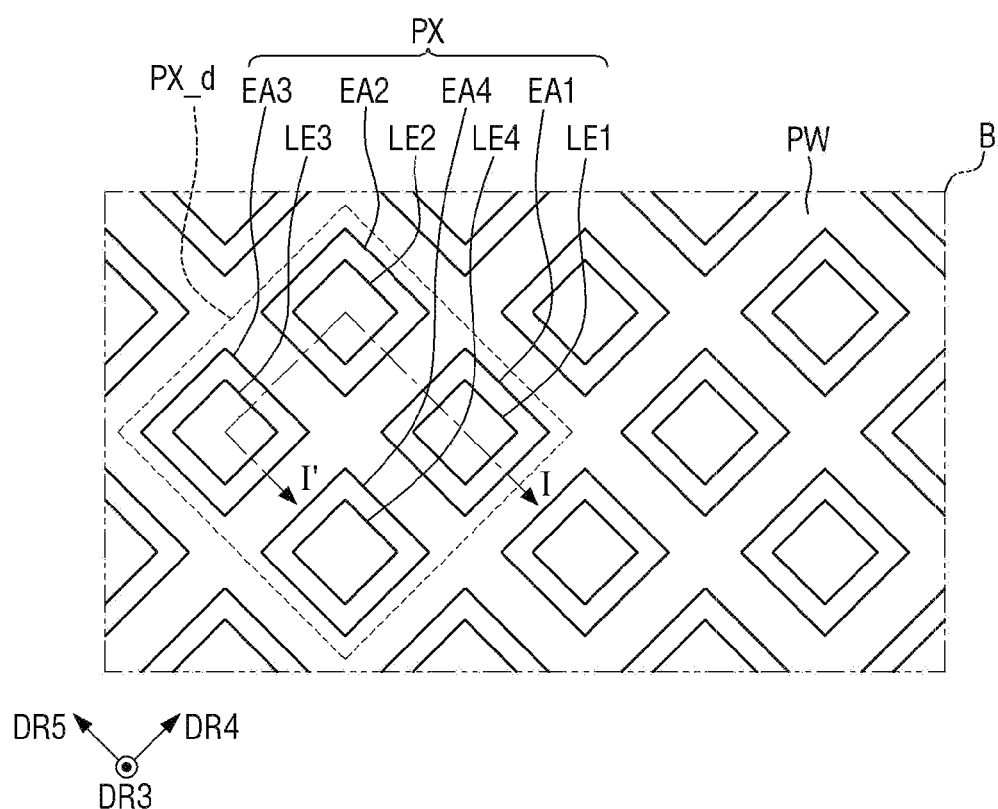
FIG. 7 is a layout diagram showing in detail pixels shown in area B of FIG. 6.

FIG. 5 is a layout diagram showing in detail a display module of the AR device shown in FIG. 2. FIG. 6 is a layout diagram showing in detail area A of FIG. 5. FIG. 7 is a layout diagram showing in detail pixels shown in area B of FIG. 6.

The display module 210 according to embodiments corresponding to FIGS. 5 to 7 has been described with an example of a light-emitting diode on silicon (LEDoS) structure in which light-emitting diodes are located on a semiconductor circuit board formed via a semiconductor process. It should be noted, however, that the embodiments of the present disclosure are not limited thereto. In addition, although the display module 210 according to embodiments of the present disclosure is a micro light-emitting diode display module (micro or nano light-emitting diode display module) including micro light-emitting diodes (micro or nano light-emitting diodes) as light-emitting elements, the embodiments of the present disclosure are not limited thereto.

Figure 9:
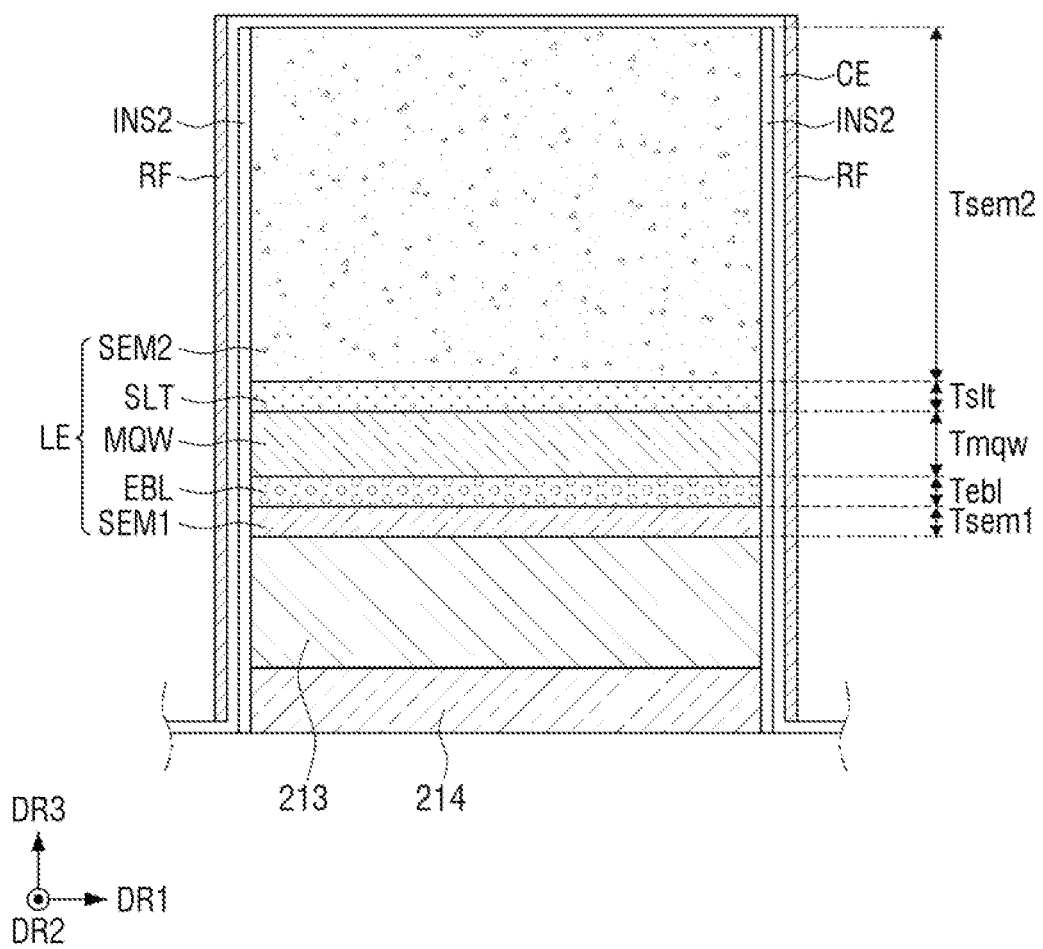
FIG. 9 is an enlarged, cross-sectional view showing in detail an example of the light-emitting elements of FIG. 8.

In FIGS. 5 to 7, a first direction DR1 indicates the horizontal direction of the display module 210, a second direction DR2 indicates the vertical direction of the display module 210, and a third direction DR3 indicates the thickness direction of a display panel 212 or the thickness direction of a semiconductor circuit board 215 (e.g., see FIG. 9). In addition, a fourth direction DR4 indicates a diagonal direction of the display panel 212, and a fifth direction DR5 indicates a diagonal direction crossing the fourth direction DR4. As used herein, the terms "left," "right," "upper," and "lower" sides indicate relative positions when the display panel 212 is viewed from the top. For example, the right side refers to one side in the first direction DR1, the left side refers to the other side in the first direction DR1, the upper side refers to one side in the second direction DR2, and the lower side refers to the other side in the second direction DR2. In addition, the upper portion refers to the side indicated by the arrow of the third direction DR3, while the lower portion refers to the opposite side in the third direction DR3.

Referring to FIGS. 5 to 7, the display module 210 has a display panel 212 including a display area DA and a non-display area NDA.

The display panel 212 may have a rectangular shape having longer sides in the first direction DR1, and shorter sides in the second direction DR2, when viewed from the top. It should be understood, however, that the shape of the display panel 212 when viewed from the top is not limited thereto. In some embodiments, the display panel 212 may have a polygonal, circular, oval, or irregular shape other than the rectangular shape when viewed from the top.

In the display area DPA, images can be displayed. In the non-display area NDA, images may not be displayed. The shape of the display area DA may follow the shape of the display panel 212 when viewed from the top. In the example shown in FIG. 5, the display area DA has a rectangular shape when viewed from the top. The display area DA may be located at the central area of the display panel 212. The non-display area NDA may be located around the display area DA. The non-display area NDA may surround the display area DA (e.g., in plan view).

The display area DA of the display panel 212 may include a plurality of pixels PX. Each of the pixels PX may be defined as the minimum light-emitting unit for reproducing white light in a defined pixel area PX_d.

Each of the pixels PX located as the minimum unit capable of reproducing white light in the pixel area PX_d may include a plurality of emission areas EA1, EA2, EA3, and EA4. In some embodiments, each of the pixels PX includes four light emitting areas EA1, EA2, EA3, and EA4 arranged in a PENTILE™ matrix (e.g., a PENTILE™ matrix structure, a PENTILE™ structure, or an RGBG structure, PENTILE™ being a registered trademark of Samsung Display Co., Ltd., Republic of Korea). However, the present disclosure is not limited thereto. For example, each of the plurality of pixels PX may include only three emission areas EA1, EA2, and EA3.

The emission areas EA1, EA2, EA3, and EA4 of each pixel area PX_d may be partitioned by the partition wall PW. The partition wall PW may be located to surround the first to fourth light-emitting elements LE1 to LE4 located in the emission areas EA1, EA2, EA3, and EA4. The partition wall PW may be located apart from the first to fourth light-emitting elements LE1 to LE4. The partition wall PW may have a mesh shape, a net shape, or a grid shape when viewed from the top.

In the example shown in FIGS. 6 and 7, each of the emission areas EA1, EA2, EA3, and EA4 defined by the partition wall PW has a diamond shape when viewed from the top which form the PENTILE™ matrix. However, the present disclosure is not limited thereto. For example, each of the emission areas EA1, EA2, EA3, and EA4 defined by the partition wall PW may have a polygonal shape, such as a quadrangle and triangle, a circular shape, an oval shape, or an irregular shape other than a diamond shape.

The first pad area PDA1 may be located in the non-display area NDA. The first pad area PDA1 may be located at the upper portion of the display panel 212. The first pad area PDA1 may include first pads PD1 connected to an external circuit board. A second pad area PDA2 may be located in the non-display area NDA. The second pad area PDA2 may be located at the lower portion of the semiconductor circuit board. The second pad area PDA2 may include second pads connected to an external circuit board. The second pad area PDA2 may be omitted in some embodiments.

Referring to FIG. 7, among the plurality of emission areas EA1, EA2, EA3, and EA4, the first emission area EA1 may include a first light-emitting element LE1 that emits a first light, the second emission area EA2 may include a second light-emitting element LE2 that emits a second light, the third emission area EA3 may include a third light-emitting element LE3 that emits a third light, and the fourth emission area EA4 may include a fourth light-emitting element LE4 that emits a fourth light. The first light may be light of a wavelength range reproducing one of red, green, and blue colors. The second light may be light of a wavelength range that reproduces one of red, green, and blue colors, which is different from the first light. The third light may be light of a wavelength range that reproduces one of red, green, and blue colors, which is different from the first light and the second light. The fourth light may be light of the same wavelength range as one of the first to third lights.

Each of the first to fourth light-emitting elements LE1 to LE4 included in the first to fourth emission areas EA1 to EA4, respectively, arranged in a PENTILE™ matrix has a diamond shape when viewed from the top. However, the present disclosure is not limited thereto. For example, each of the first to fourth light-emitting elements LE1 to LE4 may have a polygonal shape such as a triangle and quadrangle, a circular shape, an oval shape, or irregular shape other than a diamond shape.

Each of the first emission areas EA1 emits the first light. Each of the first emission areas EA1 outputs the first light emitted from the first light-emitting element LE1. As described above, the first light may be light of a wavelength range reproducing one of red, green, and blue colors. For example, the first light may be light in the red wavelength range. The red wavelength range may be about 600 nm to about 750 nm, but embodiments of the present disclosure are not limited thereto.

Each of the second emission areas EA2 emits a second light. Each of the second emission areas EA2 outputs the second light emitted from the second light-emitting element LE2. The second light may be light of a wavelength range that reproduces one of red, green, and blue colors, which is different from the first light. For example, the second light may be light in the blue wavelength range. The blue wavelength range may be about 370 nm to about 460 nm, but embodiments of the present disclosure are not limited thereto.

Each of the third emission areas EA3 emits a third light. Each of the third emission areas EA3 outputs the third light emitted from the third light-emitting element LE3. The third light may be light of a wavelength range that reproduces one of red, green, and blue colors, which is different from the first light and the second light. For example, the third light may be light in the green wavelength range. The green wavelength range may be about 480 nm to about 560 nm, but embodiments of the present disclosure are not limited thereto.

Each of the fourth emission areas EA4 emits the fourth light. Each of the fourth emission areas EA4 outputs the fourth light emitted from the fourth light-emitting element LE4. The fourth light may be light of the same wavelength range that reproduces the same color as one of the first to third lights. For example, the fourth light may be light of the same blue wavelength band as the second light, or may be light of the same green wavelength band as the third light. The embodiments of the present disclosure are not limited thereto.

The second emission areas EA2 of the pixels PX may alternately arranged with the fourth emission areas EA4 of adjacent pixels PX along the first direction DR1, which is the row (or horizontal) direction. In addition, the first emission areas EA1 and the third emission areas EA3 of the pixels PX may be alternately arranged along the first direction DR1, which is the horizontal (or row) direction. In other embodiments, the fourth emission areas EA4 of the pixels PX may alternately arranged with the second emission areas EA2 of adjacent pixels PX along the first direction DR1 which is the horizontal (or row) direction.

The first emission areas EA1 and the fourth emission areas EA4 are alternately arranged in the fourth direction DR4, which is a first diagonal direction, and the second emission areas EA2 and the third emission areas EA3 are also alternately arranged in the fourth direction DR4. That is to say, the second emission areas EA2 and the first emission areas EA1 are alternately arranged in the fifth direction DR5, which is a second diagonal direction, and the third emission areas EA3 and the fourth emission areas EA4 are also alternately arranged in the fifth direction DR5, such that the pixels PX may also be arranged generally in the PENTILE™ matrix.

The size or area of each of the first to fourth emission areas EA1 to EA4 of each of the pixels PX may have the same size or area, or may have different sizes or areas. Similarly, the first to fourth light-emitting elements LE1 to LE4 respectively formed in the first to fourth emission areas EA1 to EA4 may have the same size or area, or may have different sizes or areas.

The area of the first emission area EA1, the area of the second emission area EA2, the area of the third emission area EA3, and the area of the fourth emission area EA4 may be substantially all equal. It should be understood, however, that the present disclosure is not limited thereto. For example, the first and second emission areas EA1 and EA2 may have different areas, the second and third emission areas EA2 and EA3 may have different areas, and the third and fourth emission areas EA3 and EA4 may have different areas. In some embodiments, at least two pairs of the first to fourth emission areas EA1 to EA4 may have the same area.

The distance between the first and second emission areas EA1 and EA2, the distance between the second and third emission areas EA2 and EA3, the distance between the third and fourth emission areas EA3 and EA4, and the distance between respective ones of the first and fourth emission areas EA1 and EA4, which are adjacent to each other in the horizontal or diagonal direction, may be all equal or may be different from each other depending on the varying areas. The embodiments of the present disclosure are not limited thereto.

Although the first emission area EA1 emits the first light, the second emission area EA2 emits the second light, the third emission area EA3 emits the third light, and the fourth emission area EA4 emits the same light as one of the first to third lights in the foregoing description, this is merely illustrative. At least one of the first to fourth emission areas EA1 to EA4 may emit a fifth light. The fifth light may be light of the yellow wavelength range. For example, the main peak wavelength of the fifth light may range approximately from about 550 nm to about 600 nm, but embodiments of the present disclosure are not limited thereto.

Figure 8:
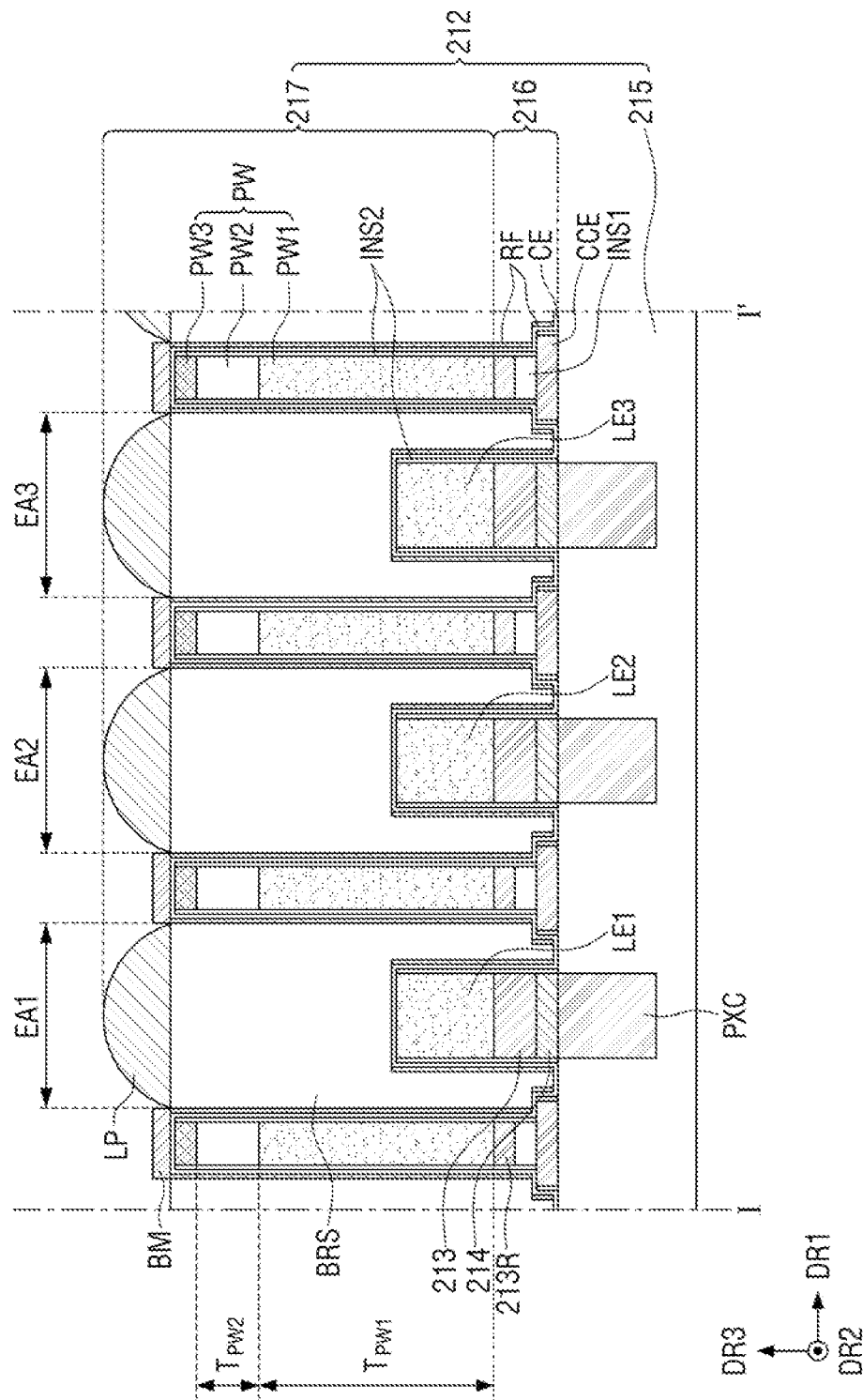
FIG. 8 is a cross-sectional view showing an example of a display panel taken along the line I-I' of FIG. 7.

FIG. 8 is a cross-sectional view showing an example of a display panel taken along the line I-I' of FIG. 7. FIG. 9 is an enlarged, cross-sectional view showing in detail an example of the light-emitting elements of FIG. 8.

Referring to FIGS. 8 and 9, the display panel 212 may include the semiconductor circuit board 215, a conductive connection layer 216, and a light-emitting element layer 217.

The semiconductor circuit board 215 may include a plurality of pixel circuits PXC and pixel electrodes 214. The conductive connection layer 216 may include connection electrodes 213, first pads PD1, a common connection electrode CCE, a first insulating layer INS1, and a conductive pattern 213R.

The semiconductor circuit board 215 may be a silicon wafer substrate formed via a semiconductor process. The plurality of pixel circuits PXC of the semiconductor circuit board 215 may be formed via a semiconductor process.

The plurality of pixel circuits PXC may be located in the display area DA (see FIG. 5). The plurality of pixel circuits PXC may be connected to the pixel electrodes 214, respectively. In other words, the plurality of pixel circuits PXC and the plurality of pixel electrodes 214 may be connected in a one-to-one correspondence. The plurality of pixel circuits PXC may overlap the light-emitting elements LE1 to LE4 in the third direction DR3, respectively. Each of the pixel circuit PXC may employ a variety of other modified pixel structures, such as a 3T1C structure, a 2T1C structure, a 7T1C structure, and a 6T1C structure.

The pixel electrodes 214 may be located on the pixel circuits PXC, respectively. Each of the pixel electrodes 214 may be an exposed electrode exposed from the respective pixel circuit PXC. In other words, each of the pixel electrodes 214 may protrude from the upper surface of the respective pixel circuit PXC. The pixel electrodes 214 may be formed integrally with the pixel circuits PXC, respectively. Each of the pixel electrodes 214 may receive a pixel voltage or an anode voltage from the respective pixel circuit PXC. The pixel electrodes 214 may be made of aluminum (Al).

The connection electrodes 213 may be located on the pixel electrodes 214, respectively. Each of the connection electrodes 213 may be located on the pixel electrode 214. The connection electrodes 213 may include a metal material for attaching the pixel electrodes 214 to the light-emitting elements LE, respectively.

The common connection electrode CCE may be spaced apart from the pixel electrode 214 and the connection electrode 213. The common connection electrode CCE may be located to surround the pixel electrode 214 and the connection electrode 213 (e.g., in plan view). The common connection electrode CCE may be connected to one of the first pads PD1 of the first pad area PDA1 of the non-display area NDA to receive a common voltage. The common connection electrode CCE may include the same material as the connection electrodes 213.

The first insulating layer INS1 may be located on the common connection electrode CCE. The width of the first insulating layer INS1 in the first direction DR1 or the second direction DR2 may be less than the width of the common connection electrode CCE. Accordingly, a part of the upper surface of the common connection electrode CCE may not be covered by the first insulating layer INS1, and instead may be exposed. The part of the upper surface of the common connection electrode CCE that is not covered by the first insulating layer INS1, and is exposed, may be in contact with the common electrode CE. Therefore, the common electrode CE may be connected to the common connection electrode CCE.

The conductive pattern 213R may be located on the first insulating layer INS1. The conductive pattern 213R may be located between the first insulating layer INS1 and the partition wall PW. The width of the conductive pattern 213R may be substantially equal to the width of the first insulating layer INS1 and/or the width of the partition wall PW. The conductive pattern 213R may be residues formed via the same process with the connection electrodes 213 and the common connection electrode CCE.

The light-emitting element layer 217 may include the light-emitting elements LE1, LE2, LE3, and LE4, the partition wall PW, a second insulating layer INS2, the common electrode CE, a reflective layer RF, a light-blocking BM, and optical patterns LP.

The light-emitting element layer 217 may include first to fourth emission areas EA1 to EA4 partitioned by the partition wall PW. At least one of the light-emitting elements LE and the optical patterns LP may be located in each of the first to fourth emission areas EA1 to EA4.

The light-emitting elements LE1, LE2, and LE3 of FIG. 8 may be located on the connection electrodes 213 in each of the emission areas EA1 to EA3. A length (or height) of each of the light-emitting elements LE1, LE2, and LE3 in the third direction DR3 may be longer than a length in the horizontal direction. The horizontal length refers to either the length in the first direction DR1 or the length in the second direction DR2. For example, the length of the first light-emitting element LE1 in the third direction DR3 may be about 1 μm to about 5 μm.

Referring to FIG. 9, each of the light-emitting elements LE includes a first semiconductor layer SEM1, an electron blocking layer EBL, an active layer MQW, a superlattice layer SLT, and a second semiconductor layer SEM2. The first semiconductor layer SEM1, the electron blocking layer EBL, the active layer MQW, the superlattice layer SLT, and the second semiconductor layer SEM2 may be stacked on one another in this order in the third direction DR3.

The first semiconductor layer SEM1 may be located on the connection electrode 213. The first semiconductor layer SEM1 may be a semiconductor layer doped with a dopant of a first conductivity type such as Mg, Zn, Ca, Se and Ba. For example, the first semiconductor layer SEM1 may be p-GaN doped with p-type Mg. The thickness of the first semiconductor layer SEM1 may range approximately from about 30 nm to about 200 nm.

The electron blocking layer EBL may be located on the first semiconductor layer SEM1. The electron blocking layer EBL may suppress or prevent too many electrons from flowing into the active layer MQW. For example, the electron blocking layer EBL may be p-AlGaN doped with p-type Mg. The thickness of the electron blocking layer EBL may be about 10 nm to about 50 nm. The electron blocking layer EBL may be omitted in other embodiments.

The active layer MQW may be divided into first to third active layers. Each of the first to third active layers may include a material having a single or multiple quantum well structure. When each of the first to third active layers includes the material having the multiple quantum well structure, well layers and barrier layers may be alternately stacked on one another in the structure. In this instance, the first active layer may include InGaN or GaAs, and the second active layer and the third active layer may include InGaN. It should be understood, however, that the present disclosure is not limited thereto. The first active layer may emit light by combining electron-hole pairs according to an electrical signal. The first active layer may emit first light having a main peak wavelength in the range of about 600 nm to about 750 nm (e.g., light of the red wavelength range). The second active layer may emit light by combining electron-hole pairs according to an electrical signal. The second active layer may emit third light having a main peak wavelength in the range of about 480 nm to about 560 nm (e.g., light of the green wavelength range). The third active layer may emit light by combining electron-hole pairs according to an electrical signal. The third active layer may emit second light having a main peak wavelength in the range of about 370 nm to about 460 nm (e.g., light of the blue wavelength range).

The first to third active layers may emit lights of different colors depending on the contents of indium. For example, as the content of indium (In) decreases, the wavelength range of light output from each of the first to third active layers may move to the red wavelength range, and as the content of indium (In) increases, the wavelength range of the output light may move to the blue wavelength range. The content of indium (In) in the first active layer may be higher than the content of indium (In) in the second active layer, and the content of indium (In) in the second active layer may be higher than the content of indium (In) in the third active layer. For example, the content of indium (In) in the third active layer may be 15%, the content of indium (In) in the second active layer may be 25%, and the content of indium (In) in the first active layer may be 35% or more. As described above, because the color of emitted light may vary depending on the content of indium each of the first to third active layers, the light-emitting element layer 217 of each of the light-emitting elements LE1, LE2, and LE3 may emit lights, such as the first light, the second light, and the third light equally or differently depending on the content of the indium.

The superlattice layer SLT may be located on the active layer MQW. The superlattice layer SLT may relieve stress between the second semiconductor layer SEM2 and the active layer MQW. For example, the superlattice layer SLT may be made of InGaN or GaN. The thickness of the superlattice layer SLT may be about 50 nm to about 200 nm. The superlattice layer SLT may be omitted in other embodiments.

The second semiconductor layer SEM2 may be located on the superlattice layer SLT. The second semiconductor layer SEM2 may be doped with a dopant of a second conductivity type, such as Si, Ge and Sn. For example, the second semiconductor layer 32 may be n-GaN doped with n-type Si. The thickness of the second semiconductor layer 32 may range approximately from about 2 μm to about 4 μm.

The partition wall PW may be spaced apart from the light-emitting elements LE1 to LE4 located in the first to fourth emission areas EA1 to EA4, respectively. The partition wall PW may surround (e.g., in a plan view) the light-emitting elements LE1 to LE4 located in the first to fourth emission areas EA1 to EA4, respectively.

The partition wall PW may be located on the common connection electrode CCE. The width of the partition wall PW in the first direction DR1 and the second direction DR2 may be less than the width of the common connection electrode CCE. The partition wall PW may be spaced apart from the light-emitting elements LE.

The partition wall PW may include a first partition wall PW1, a second partition wall PW2, and a third partition wall PW3. The first partition wall PW1 may be located on the first insulating layer INS1. Because the first partition wall PW1 is formed via the same process with the light-emitting element LE, at least a part of the first partition wall PW1 may include the same material as that of the light-emitting element LE. In addition, a thickness $T_{PW1}$ of the first partition wall PW1 is greater than a thickness $T_{PW2}$ of the second partition wall PW2.

The second insulating layer INS2 may be located on the side surfaces of the common connection electrode CCE, the side surfaces of the partition wall PW, the side surfaces of each of the pixel electrodes 214, the side surfaces of each of the connection electrodes 213, and the side surfaces of each of light-emitting elements LE1 to LE4. The second insulating layer INS2 may be implemented as an inorganic layer such as a silicon oxide layer ($SiO_2$). The thickness of the second insulating layer INS2 may be about 0.1 μm.

The common electrode CE may be located on the upper surfaces of each of the light-emitting elements LE1 to LE4 and of the partition wall PW, and on side surfaces of each of the light-emitting elements LE1 to LE4 and of the partition wall PW (e.g., with the insulating layer INS2 therebetween). That is, the common electrode CE may be located to cover the upper and side surfaces of each of the light-emitting elements LE1 to LE4 and the upper and side surfaces of the partition wall PW.

The common electrode CE may be in contact with the second insulating layer INS2 located on the side surfaces of the common connection electrode CCE, on the side surfaces of the partition wall PW, on the side surfaces of each of the pixel electrodes 214, on the side surfaces of each of the connection electrodes 213, and on the side surfaces of each of light-emitting elements LE1 to LE4. In addition, the common electrode CE may be in contact with the upper surface of the common connection electrode CCE, the upper surface of each of the light-emitting elements LE1 to LE4, and the upper surface of the partition wall PW.

The common electrode CE may be in contact with the upper surface of the common connection electrode CCE and the upper surfaces of the light-emitting elements LE1 to LE4 that are not covered by the second insulating layer INS2. Therefore, the common voltage supplied to the common connection electrode CCE may be applied to the light-emitting elements LE1 to LE4. That is to say, a first end of each of the light-emitting elements LE1 to LE4 may receive the pixel voltage or the anode voltage of the pixel electrode 214 through the connection electrode 213, and a second end thereof may receive the common voltage through the common electrode CE. The light-emitting element LE may emit light with a luminance (e.g., a predetermined luminance) according to a voltage difference between the pixel voltage and the common voltage.

The reflective layer RF may be located on side surfaces of the common connection electrode CCE, side surfaces of the partition wall PW, side surfaces of each of the pixel electrodes 214, side surfaces of each of the connection electrodes 213, and side surfaces of each of light-emitting elements LE1 to LE4 (e.g., with the common electrode CE and the second insulating layer INS2 therebetween). The reflective layer RF serves to reflect some of the lights emitted from the light-emitting elements LE1 to LE4 that travel in other directions than the vertical direction. The reflective layer RF may include a metal material having high reflectivity, such as aluminum (Al). The thickness of the reflective layer RF may be about 0.1 µm.

A base resin BRS may be located on a protective layer PTF in each of the light-emitting elements LE1 to LE4. The base resin BRS may include a transparent organic material. The base resin BRS may further include scattering particles for scattering the light of the light-emitting elements LE1 to LE4 in random directions. The scattering particles may include metal oxide particles or organic particles.

The light-blocking member BM may be located on the partition wall PW. The light-blocking member BM may include a light-blocking material. The light-blocking member BM may be located between adjacent ones of the emission areas EA1, EA2, EA3, and EA4, and can reduce or prevent color mixing between lights in different wavelength ranges emitted from the light-emitting elements LE1 to LE4 of the emission areas EA1, EA2, EA3, and EA4. In addition, the light-blocking member BM may absorb at least a part of external light incident from the outside on the light-emitting element layer 217 to reduce reflection of the external light. The light-blocking member BM may be located on or above the partition wall PW, and may be further extended to the emission areas EA1, EA2, EA3, and EA4. That is to say, the width of the light-blocking member BM may be greater than the width of the partition wall PW.

The optical patterns LP may be selectively located on the emission areas EA1, EA2, EA3, and EA4. The optical patterns LP may be located directly on the base resins BRS of the emission areas EA1, EA2, EA3, and EA4, respectively. The optical patterns LP may have a shape that protrudes upward (e.g., in a direction toward each optical pattern LP from the light-emitting elements LE1 to LE4, respectively). For example, the cross-sectional shape of each of the optical patterns LP may include a lens shape that is convex upward. Each of the optical patterns LP may be located on or above the base resin BRS thereunder, and may be partially above the light-blocking member BM (e.g., may be thicker than the light-blocking member in the thickness direction DR3). The width of the optical patterns LP (e.g., in the first direction or the second direction) may be equal to, greater than, or less than the width of the emission areas EA1, EA2, EA3, and EA4. The optical patterns LP may respectively condense the first to third lights transmitted through the base resins BRS in the emission areas EA1, EA2, EA3, and EA4.

Figure 10:
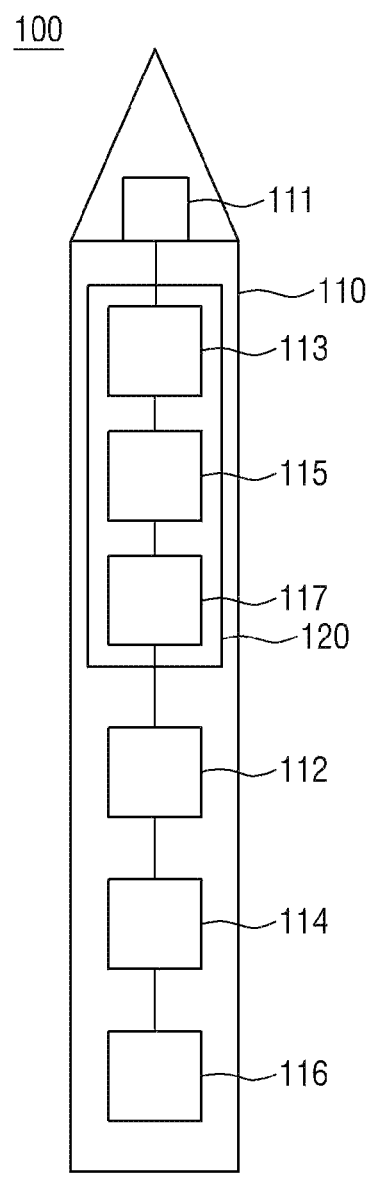
FIG. 10 is a block diagram schematically illustrating the configuration of an electronic pen according to some embodiments.

FIG. 10 is a block diagram schematically illustrating the configuration of an electronic pen according to some embodiments.

Referring to FIG. 10, the electronic pen 100 includes a laser pointer 111, a motion detection module 120, an interface module 112, a short-range wireless communications module 114, and a power module 116.

The laser pointer 111 is formed inside or at one end of a housing 110 in the form of a writing tool, and transmits an infrared laser pursuant to the user's on/off control through the interface module 112.

The motion detection module 120 may be provided inside the housing 110, or may be mounted on or attached to the outside of the housing 110. The motion detection module 120 may generate motion-sensing signals according to the movement direction, distance, speed, inclination, etc. of the motion detection module 120 in response to a drawing start signal input through the interface module 112, etc.

The motion detection module 120 includes an acceleration sensor 113, a gyro sensor 115, and a tilt sensor 117. The motion detection module 120 may further include a geomagnetic sensor, a gravity sensor, an altimeter, etc., to generate motion-sensing signals. When the drawing start signal is input, the motion detection module 120 continuously transmits motion-sensing signals including an acceleration signal, an angular velocity signal, a tilt signal, etc. to the short-range wireless communications module 114 until a drawing stop signal is input.

The interface module 112 includes at least one switch, a pressure-sensing module, and/or a switching-signal-transmitting module. When at least one switch is turned on by the user control, the interface module 112 may transmit a drawing start signal to the motion detection module 120 through the switching-signal-transmitting module. When at least one switch is turned off, the interface module 112 may transmit a drawing stop signal to the motion detection module 120 through the switching-signal-transmitting module. When the pressure-sensing module is pressed by the user, the interface module 112 may transmit the drawing start signal to the motion detection module 120 through the switching-signal-transmitting module. When the pressure-sensing module is no longer pressed, the drawing stop signal may be transmitted to the motion detection module 120.

When the user wants to display the motion information of the electronic pen 100 over the augmented reality contents, the user may turn on the switch of the interface module 112 and may control the movement of the electronic pen 100. In addition, when the user wants to display the motion information of the electronic pen 100 over the augmented reality contents, the user may control the movement of the electronic pen 100 while pressing the pressure-sensing module. When the user turns off the switch of the interface module 112, or when the user stops pressing the pressure-sensing module, the operation of displaying the motion information of the electronic pen 100, such that the motion information is superimposed on the augmented reality contents, may be stopped. In addition, when the user wants to display the motion information of the electronic pen 100 such that the motion information is superimposed on the augmented reality contents, she/he may locate the electronic pen 100 within the viewing angle, and may gaze at the electronic pen 100 for a period of time (e.g., a predetermined period of time), to control the transmission of motion-sensing signals of the electronic pen 100.

The short-range wireless communications module 114 includes at least one communications module among a Bluetooth® module, an infrared data association (IrDA)

module, a Wi-Fi-Direct® communications module, and a near-field communications (NFC) module. Wi-Fi® and Wi-Fi-Direct® are registered trademarks of the non-profit Wi-Fi Alliance. BLUETOOTH® is a registered trademark of Bluetooth Sig, Inc., Kirkland, WA Accordingly, the short-range wireless communications module 114 can perform pairing and wireless communications with the AR device 200 by using at least one communication technology among Bluetooth®, infrared communication, Wi-Fi-Direct® and NFC.

When a motion-sensing signal including at least one of an acceleration signal, an angular velocity signal, and a tilt signal is input through the motion detection module 120, the short-range wireless communications module 114 transmits the motion-sensing signal by using at least one communication technology paired with the AR device 200 among Bluetooth®, infrared communication, Wi-Fi-Direct®, and NFC.

The power module 116 supplies driving power to the motion detection module 120, the at least one interface module 112, and the short-range wireless communications modules 114 using at least one battery.

Figure 11:
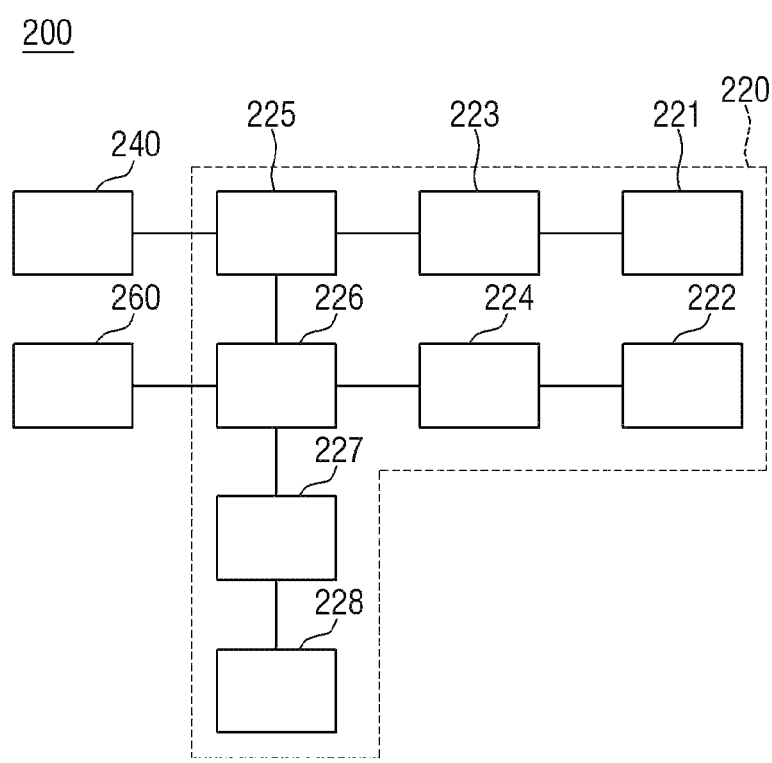
FIG. 11 is a block diagram schematically illustrating the control module provided in the AR device of FIGS. 2 to 4.

FIG. 11 is a block diagram schematically illustrating the control module provided in the AR device of FIGS. 2 to 4.

Referring to FIGS. 11, the control module 220 includes a first wireless communications unit 221, a location-information-calculating unit 223, a signal processing control unit 225, an image-processing unit 226, an image display control unit 227, a memory 228, a data-correcting unit 224, and a second wireless communications unit 222.

The first wireless communications unit 221 includes at least one short-range communications module among a Bluetooth® module, an infrared communications module, a Wi-Fi-Direct® communications module, and an NFC module, and is paired with the short-range wireless communications module 114 of the electronic pen 100 by using at least one communication technology among Bluetooth®, infrared communication, Wi-Fi-Direct®, and NFC.

The first wireless communications unit 221 conducts short-range wireless communications with the paired electronic pen 100 to receive motion-sensing signals including at least one of an acceleration signal, an angular velocity signal, and a tilt signal from the electronic pen 100. The received motion-sensing signal is shared by the location-information-calculating unit 223 in real time.

When a drawing start signal or a drawing stop signal is input from the image-processing unit 226, the first wireless communications unit 221 transmits the drawing start signal or the drawing stop signal to the short-range wireless communications module 114 of the paired electronic pen 100. Accordingly, the motion detection module 120 of the electronic pen 100 paired with the first wireless communications unit 221 may generate and transmit motion-sensing signals in response to the drawing start signal, and may stop generating the motion-sensing signals in response to the drawing stop signal.

The location-information-calculating unit 223 uses the motion-sensing signal input through the first wireless communications unit 221 (e.g., at least one of an acceleration signal, an angular velocity signal, and a tilt signal) to continuously calculate location coordinate information of the electronic pen 100. For example, the electronic pen 100 uses the acceleration sensor 113, the gyro sensor 115, and the tilt sensor 117 to transmit an acceleration signal, an angular velocity signal, a tilt signal, etc. that vary in real time depending on the distance moving in a plurality of axis directions (e.g., the x-axis, y-axis and z-axis directions), speed and tilt, etc., and transmits them. Accordingly, the location-information-calculating unit 223 may calculate the coordinates (e.g., the x-axis coordinate, the y-axis coordinate, and the z-axis coordinate) of the location of the electronic pen 100 according to the distance, speed, and tilt change of the electronic pen 100 moving in a plurality of axes (e.g., the x-axis, the y-axis, and the z-axis).

The image-processing unit 226 uses the sensing signals from the sensing module 240, image data items from the image sensor 260, and pupil-sensing signals from the first and second biosensors 231 and 232, to thereby detect the state and period of time in which the user gazes at the electronic pen 100.

For example, the image-processing unit 226 detects the moving distance of the AR device 200 and image data items on the front side through sensing signals from the sensing module 240, and image data items from the image sensor 260. In addition, the image-processing unit 226 divides the image data of the AR device 200 on the front side into a plurality of block areas (e.g., predetermined block areas). In addition, the image-processing unit 226 identifies the coordinates of the user's gaze point based on matrix arrangement information of the infrared sensors located on the first and second biosensors 231 and 232, and the results of movement analysis of the pupil-sensing signals according to the matrix arrangement information. Then, the image-processing unit 226 analyzes the image of the divided block areas associated with the coordinates of the user's gaze point among the plurality of divided image data items on the front side to detect the electronic pen 100. The image-processing unit 226 may transmit a drawing start signal to the electronic pen 100 through the first wireless communications unit 221 based on a period in which the electronic pen 100 is detected in the image of the divided block areas associated with the coordinates of the user's gaze point. Later on, the image-processing unit 226 may transmit a drawing stop signal to the electronic pen 100 through the first wireless communication unit 221 based again on a period in which the electronic pen 100 is detected in the image of the divided block areas associated with the coordinates of the user's gaze point.

In addition, the image-processing unit 226 generates moving path data of the electronic pen 100 by connecting location coordinate information pieces of the electronic pen 100. For example, the image-processing unit 226 continuously stores the location coordinates (e.g., the x-axis coordinate, the y-axis coordinate, and the z-axis coordinate) of the electronic pen 100 continuously calculated from the location-information-calculating unit 223 in the corresponding coordinate writing space data or block data of the size of the augmented reality contents to thereby generate the moving path data of the electronic pen 100.

The data-correcting unit 224 modulates the augmented reality contents data so that the moving path data of the electronic pen 100 generated in real time is written into the augmented reality contents data.

For example, the data-correcting unit 224 divides the augmented reality contents data input through the memory 228 or through the image display control unit 227 at least frame by frame to store them. Then, the moving path data of the electronic pen 100 is corrected according to characteristics such as the size, resolution, and frame frequency of each frame of the augmented reality contents data. Subsequently, the augmented reality contents data is modulated so that the corrected moving path data of the electronic pen 100 is written into the augmented reality contents data.

The image display control unit 227 controls the image display operation of the at least one display module 210 so that the augmented reality contents input from the memory 228 or input the outside are displayed through the at least one display module 210 and the transparent lens 201. Then, when the augmented reality contents data is modulated by the data-correcting unit 224, an image display operation of the at least one display module 210 is controlled so that the modulated augmented reality contents data is displayed. For example, when the augmented reality contents data, in which the moving path data items of the electronic pen 100 is written (i.e., the modulated augmented reality contents data items), is input from the data-correcting unit 224, the image display control unit 227 may transmit the modulated augmented reality contents data items firstly to the at least one display module 210. In addition, the driving timing and display operation of the at least one display module 210 are controlled so that the modulated augmented reality contents data items are displayed through the at least one display module 210 and the transparent lens 201.

The memory 228 stores the augmented reality contents data input from the outside, or the augmented reality contents data items in which moving path data items of the electronic pen 100 are written by modulation of the data-correcting unit 224, and shares it with the image display control unit 227.

The second wireless communications unit 222 may include at least one short-range communications module among a Bluetooth® module, an infrared communications module, a Wi-Fi-Direct® communications module, and an NFC module, or may include a long-range communications module such as 3G, LTE, and 5G. Accordingly, the second wireless communications unit 222 may be paired with at least one contents display device 300 by a short-range or long-range communications technology. The second wireless communications unit 222 transmits the augmented reality contents data input from the outside, or the augmented reality contents data items in which moving path data items of the electronic pen 100 are written by modulation of the data-correcting unit 224 to the at least one contents display device 300. Accordingly, the at least one contents display device 300 may display augmented reality contents, in which moving path data items of the electronic pen 100 are written, in the same manner as the modulated augmented reality contents displayed on the AR device 200.

Figure 12:
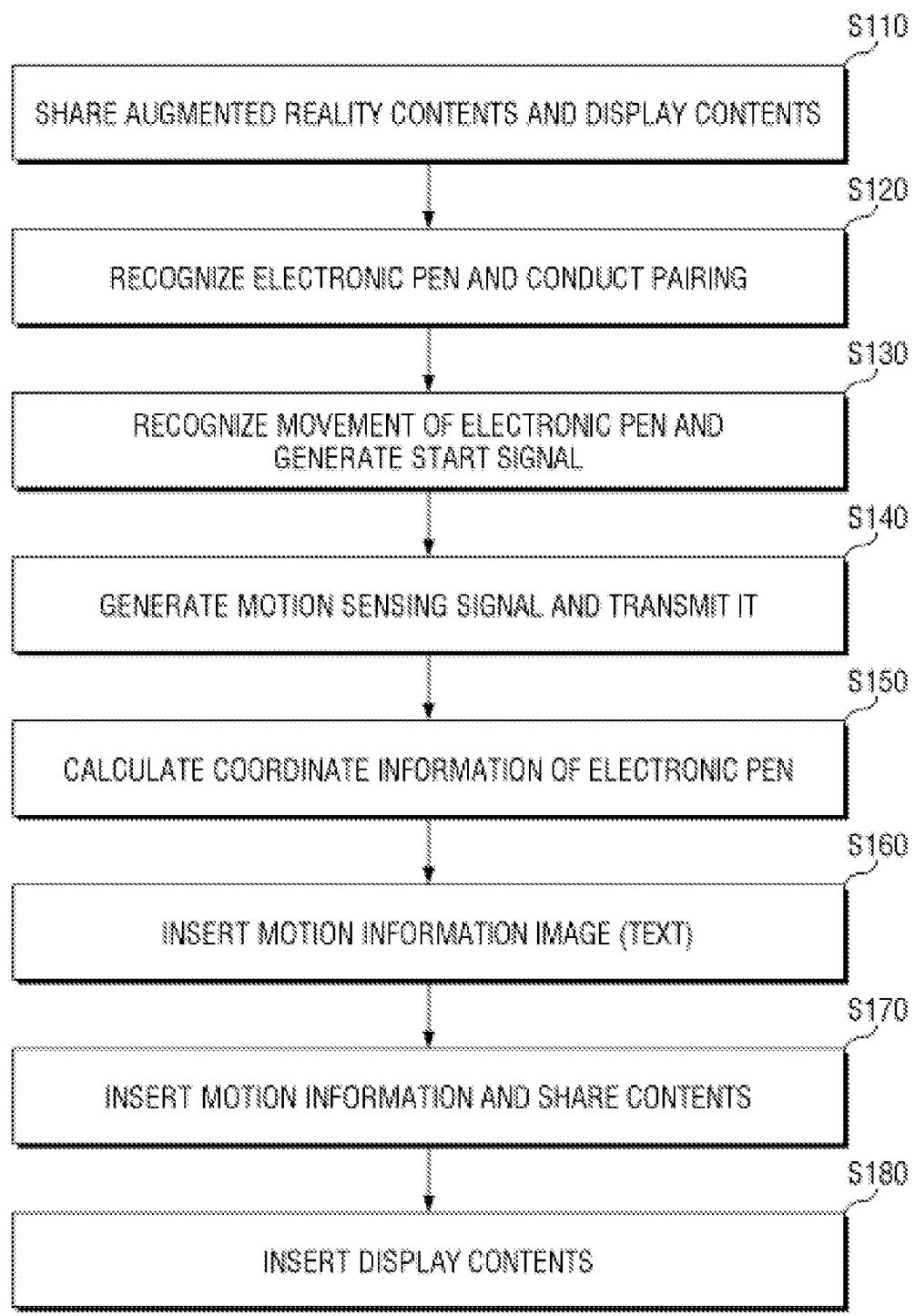
FIG. 12 is a flowchart for illustrating a method for providing augmented reality using the AR device according to some embodiments of the present disclosure.
Figure 13:
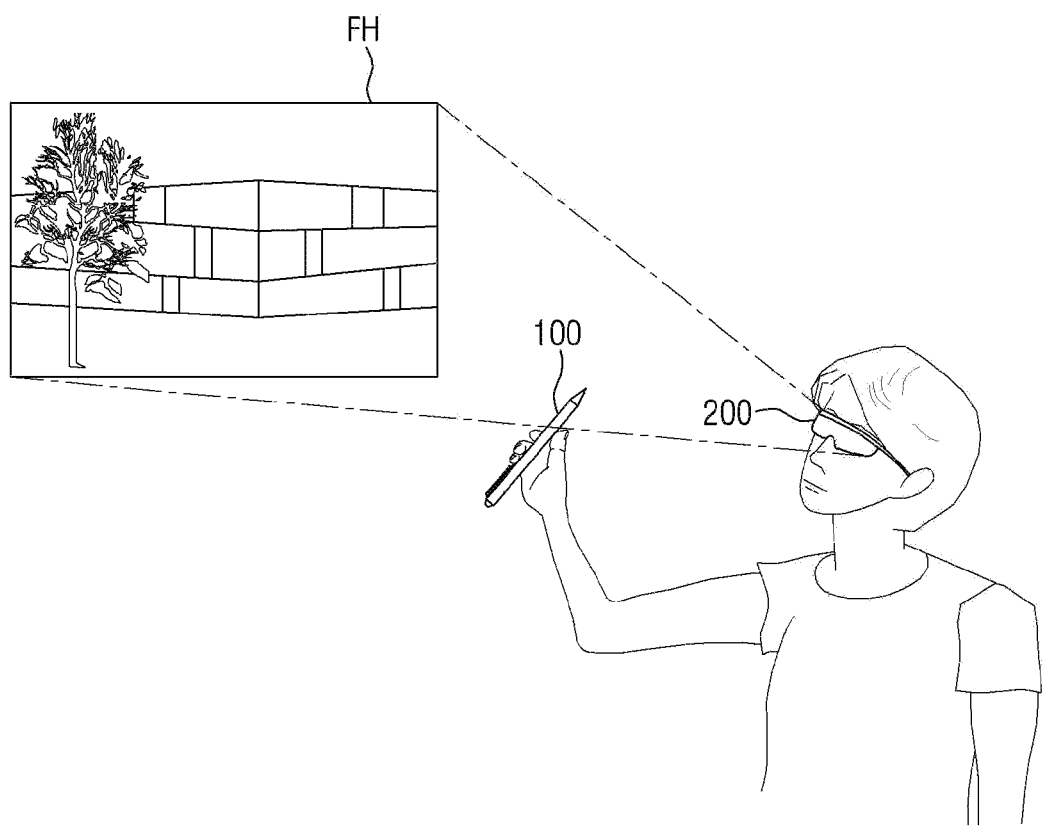
FIG. 13 is a view showing a method of using an electronic pen and an AR device according to some embodiments of the present disclosure.

FIG. 12 is a flowchart for illustrating a method for providing augmented reality using the AR device according to some embodiments of the present disclosure. FIG. 13 is a view showing a method for using an electronic pen and an AR device according to some embodiments of the present disclosure.

Referring to FIGS. 12 and 13, the image display control unit 227 controls the image display operation of the at least one display module 210 so that the augmented reality contents FH from the memory 228 or from the outside are displayed through the at least one display module 210 and the transparent lens 201. The augmented reality contents FH are also shared with at least one contents display device 300 through the second wireless communications unit 222, so that the augmented reality contents FH displayed on the AR device 200 may be displayed on the at least one contents display device 300 as well (operation S110 of FIG. 12).

The first wireless communications unit 221 of the AR device 200 is paired with the short-range wireless communications module 114 of the electronic pen 100 via a wireless communication scheme such as Bluetooth® communications, e.g., recognizing the electronic pen 100 and conducting the pairing (operation S120 of FIG. 12).

When the user wants to display the motion information of the electronic pen 100 such that the motion information is superimposed on the augmented reality contents FH, she/he may turn on a switch formed in the interface module 112 of the electronic pen 100, or may press the pressure-sensing module, so that the drawing start signal is generated in the interface module 112. Because the drawing start signal is transmitted to the motion detection module 120 of the electronic pen 100, the motion detection module 120 generates a motion-sensing signal including at least one of an acceleration signal, an angular velocity signal, and a tilt signal. Alternatively, when the user wants to display the motion information of the electronic pen 100 such that the motion information is superimposed on the augmented reality contents, she/he may gaze at the electronic pen 100 for a period of time (e.g., a predetermined period of time) to generate the drawing start signal in the image-processing unit 226 of the AR device 200. The drawing start signal generated by the image-processing unit 226 is transmitted to the motion detection module 120 through the first wireless communications unit 221 and the short-range wireless communications module 114 of the electronic pen 100, e.g., recognizing the movement of the electronic pen 100 and generating the drawing start signal (operation S130 of FIG. 12).

A method for controlling the generation and transmission of the drawing start signal in the AR device 200 by the user gazing at the electronic pen 100 for a period of time (e.g., a predetermined period of time) (operation S130 of FIG. 12) will be described in more detail below.

Figure 14:
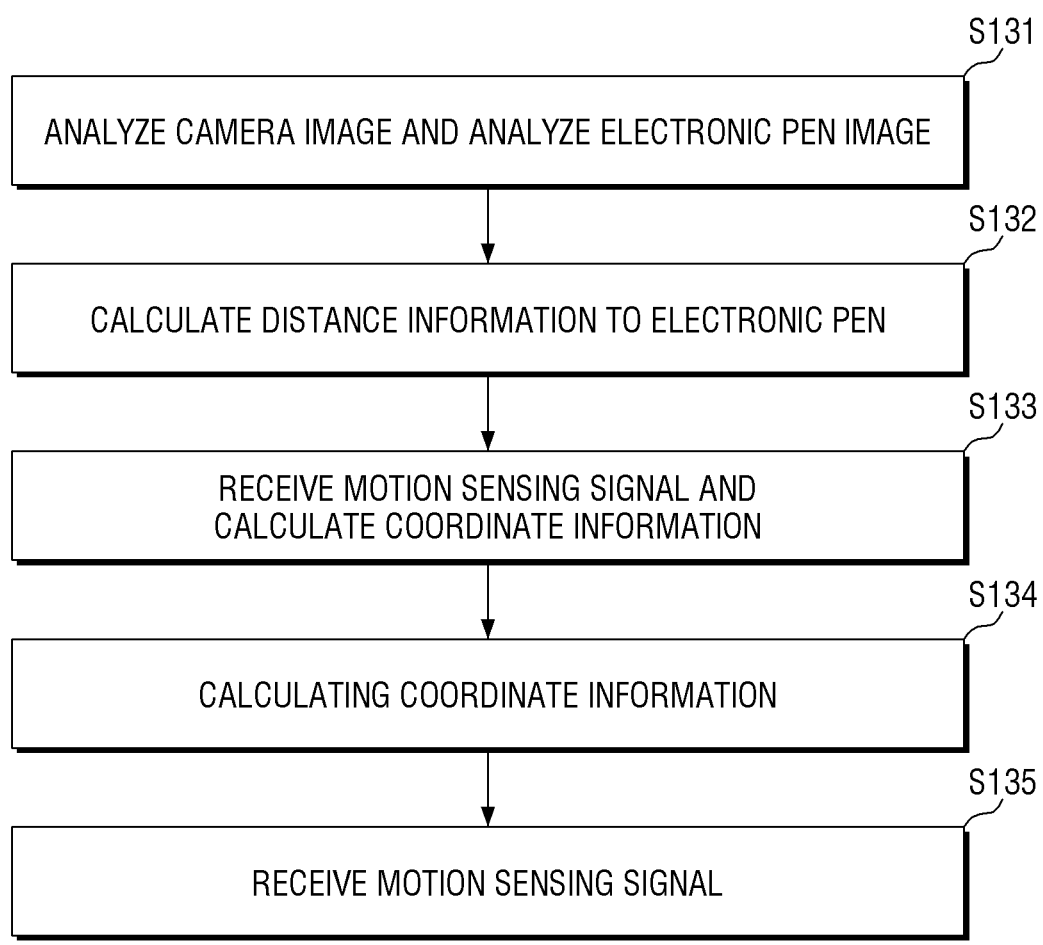
FIG. 14 is a flowchart illustrating a method for generating a drawing start signal by recognizing an electronic pen according to some embodiments.
Figure 15:
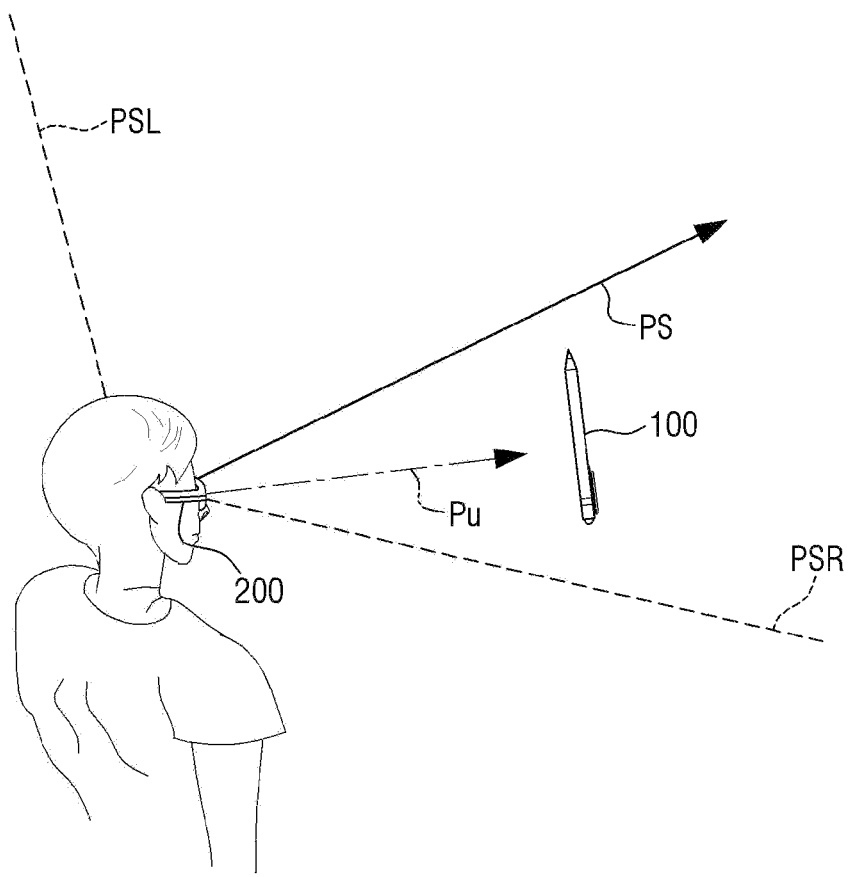
FIG. 15 is a view showing a method of recognizing an electronic pen using an AR device according to some embodiments of the present disclosure.
Figure 16:
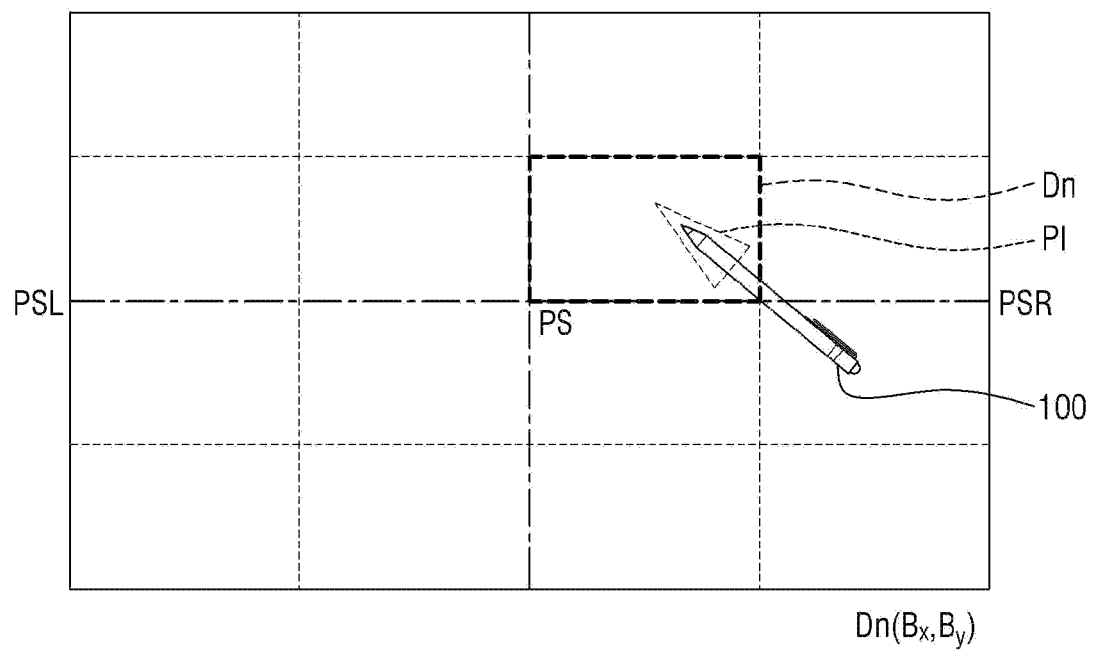
FIG. 16 is a view showing a method for recognizing an electronic pen by pupil tracking and image analysis according to some embodiments.

FIG. 14 is a flowchart illustrating a method for generating a drawing start signal by recognizing electronic pen according to some embodiments. FIG. 15 is a view showing a method of recognizing an electronic pen using an AR device according to some embodiments of the present disclosure. FIG. 16 is a view showing a method for recognizing an electronic pen by pupil tracking and image analysis according to some embodiments.

Referring to FIGS. 14 and 15, the image-processing unit 226 detects image data items on the front side of the AR device 200 based on sensing signals from the sensing module 240 and based on image data items from the image sensor 260. The image data items on the front side may be captured and detected as frame data having size and resolution (e.g., predetermined size and resolution) depending on the angles of view PSL to PSR in the left and right and up and down directions of the image sensor 260. That is, the sensing module 240 can detect and generate image data frame by frame having a size corresponding to the range of angles of view PSL to PSR with respect to the front side or front point PS of the image sensor 260. In addition, the image-processing unit 226 stores the image data on the front side at least frame by frame.

Referring to FIGS. 15 and 16, the image-processing unit 226 divides the image data on the front side into a plurality of block areas (e.g., predetermined block areas) Dn(Bx, By). The image-processing unit 226 identifies the coordinates of the user's gaze point based on the matrix arrangement information of the infrared sensors arranged on the first and second biosensors 231 and 232, and the results of movement analysis of the pupil-sensing signals according to the matrix directions. Then, the image-processing unit 226 analyzes the image of the divided block areas associated with the coordinate information Pu of the user's pupil gaze point among the plurality of divided image data items on the front side to detect the electronic pen 100. The image-processing unit 226 may detect the image of the shape of the electronic pen 100 based on analysis results of a grayscale or luminance difference between pixels in the divided block areas Dn corresponding to the pupil gaze point coordinate information Pu, or analysis results of comparing the pixel data with a mask in the form of the electronic pen 100, etc. e.g., analyzing the block area image and detecting the electronic pen image (operation S131 of FIG. 14).

When the electronic pen 100 is detected in the image of the divided block areas corresponding to the user gaze point coordinate information Pu, the image-processing unit 226 may calculate the distance information to the electronic pen 100 based on the distance-sensing signal from the sensing module 240 (operation S132 of FIG. 14). In addition, when the distance information to the electronic pen 100 is less than or equal to reference distance information (e.g., predetermined reference distance information), it may be determined that the user has the electronic pen 100, and accordingly a drawing start signal is transmitted to the electronic pen 100 through the first wireless communications unit 221.

The motion detection module 120 of the electronic pen 100 transmits a motion-sensing signal including an acceleration signal, an angular velocity signal, and a tilt signal to the short-range wireless communications module 114 in response to the drawing start signal. Accordingly, the location-information-calculating unit 223 may receive the motion-sensing signal through the first wireless communications unit 221 to check whether the short-range wireless communications module 114 is paired with the first wireless communications unit 221 (operation S133 of FIG. 14).

In addition, the location-information-calculating unit 223 calculates the coordinates (e.g., the x-axis coordinate, the y-axis coordinate, and the z-axis coordinate) of the location of the electronic pen 100 according to changes in the distance, speed and tilt of the electronic pen 100 moving in the x-axis, the y-axis and the z-axis directions. The recognition radius and movement radius of the electronic pen 100 may be set to avoid confusion with another electronic pen according to changes in the x-axis coordinate, the y-axis coordinate, and the z-axis coordinate of the electronic pen 100 (operation S134 of FIG. 14).

The location-information-calculating unit 223 receives the motion-sensing signal in real time through the first wireless communications unit 221 according to the use and movement radius of the electronic pen 100 (operation S136 of FIG. 14).

Figure 17:
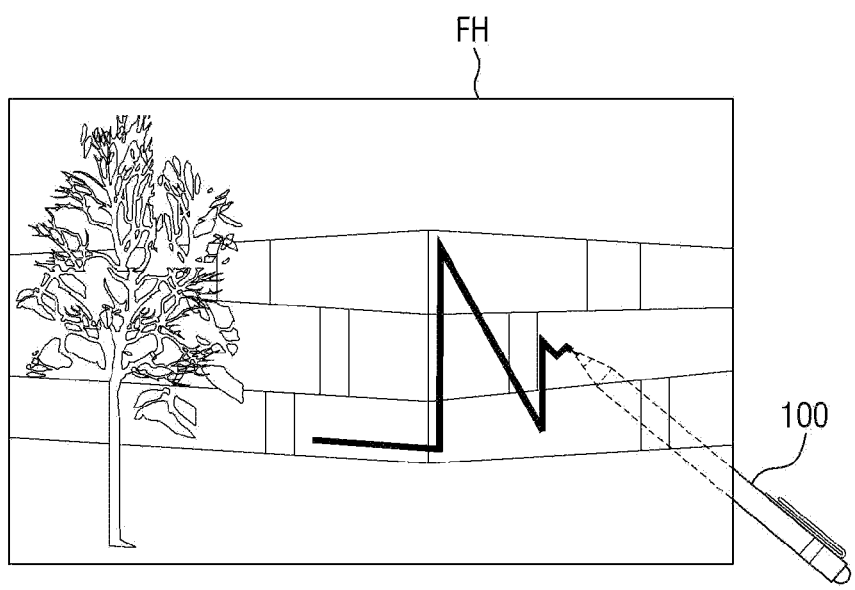
FIG. 17 is a view showing a display screen on which augmented reality contents of an AR device and a recognized electronic pen.

FIG. 17 is a view showing a display screen on which augmented reality contents and a recognized electronic pen according to some embodiments.

Referring to FIG. 17, the image display control unit 227 controls at least one display module 210 to display the augmented reality contents through the transparent lens 201 so that the user can use and check the augmented reality contents FH.

To superimpose the motion information of the electronic pen 100 on the augmented reality contents FH, the user may locate the electronic pen 100 to overlap with the augmented reality contents FH to gaze at the electronic pen 100, thereby generating a drawing start signal to control the movement of the electronic pen 100. The motion detection module 120 of the electronic pen 100 transmits a motion-sensing signal including an acceleration signal, an angular velocity signal, and a tilt signal to the short-range wireless communication module 114 in response to the drawing start signal. e.g., generating the motion sensing signal and transmitting it (operation S140 of FIG. 12).

The location-information-calculating unit 223 continuously calculates location coordinate information of the electronic pen 100 using a motion-sensing signal input through the first wireless communications unit 221. In doing so, the location-information-calculating unit 223 may continuously calculate the location coordinates of the electronic pen 100 based on changes in the distance, speed, and tilt of the moving electronic pen 100. e.g., calculating the coordinate information or coordinate information pieces of the electronic pen 100 (operation S150 of FIG. 12).

The image-processing unit 226 generates the moving path data of the electronic pen 100 by connecting the location coordinate information pieces of the electronic pen 100. The data-correcting unit 224 modulates the augmented reality contents data so that the moving path data items of the electronic pen 100 is written into the augmented reality contents data (operation S160 of FIG. 12).

Hereinafter, a method for generating moving path data of the electronic pen 100 and writing the moving path of the electronic pen 100 into the augmented reality contents data will be described in more detail.

Figure 18:
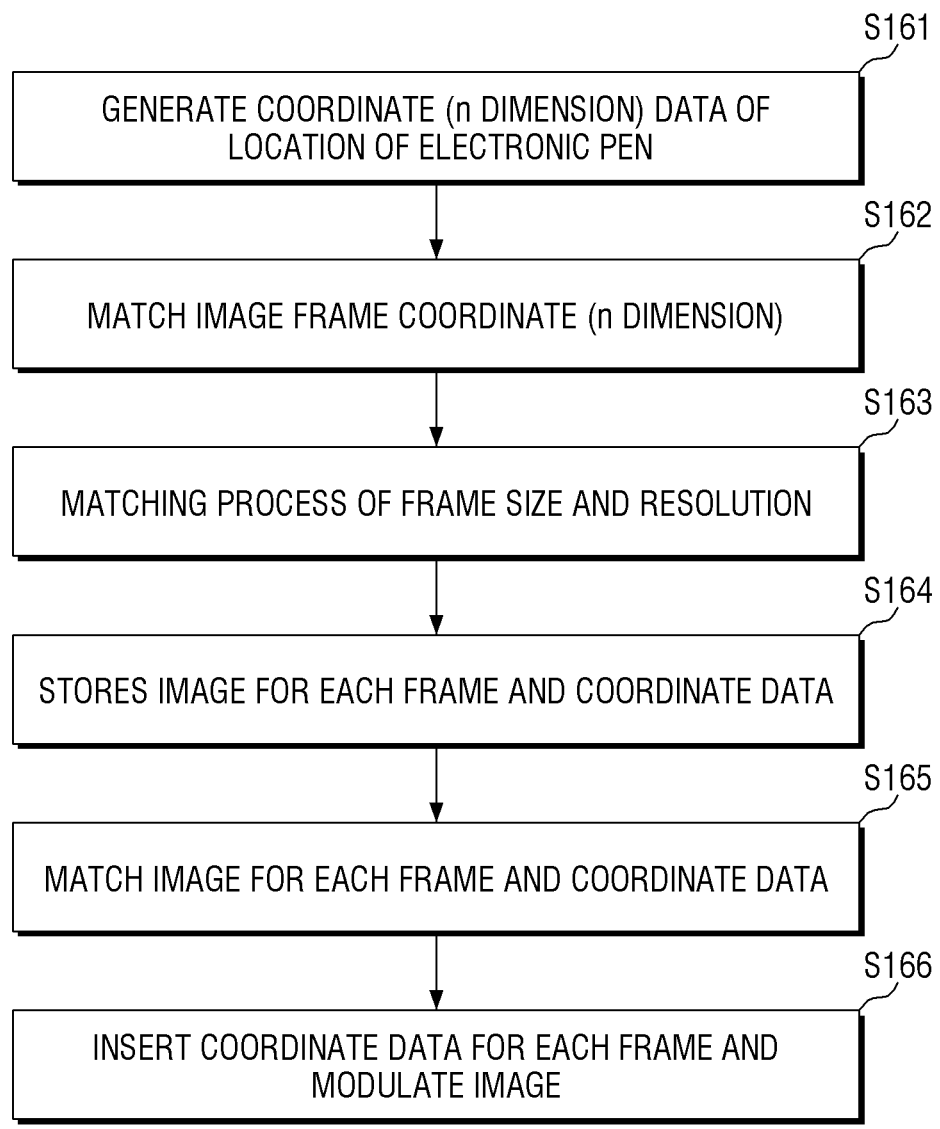
FIG. 18 is a flowchart for illustrating a method for inserting motion information of an electronic pen by recognizing the motion of the electronic pen and displaying augmented reality contents according to some embodiments of the present disclosure.
Figure 19:
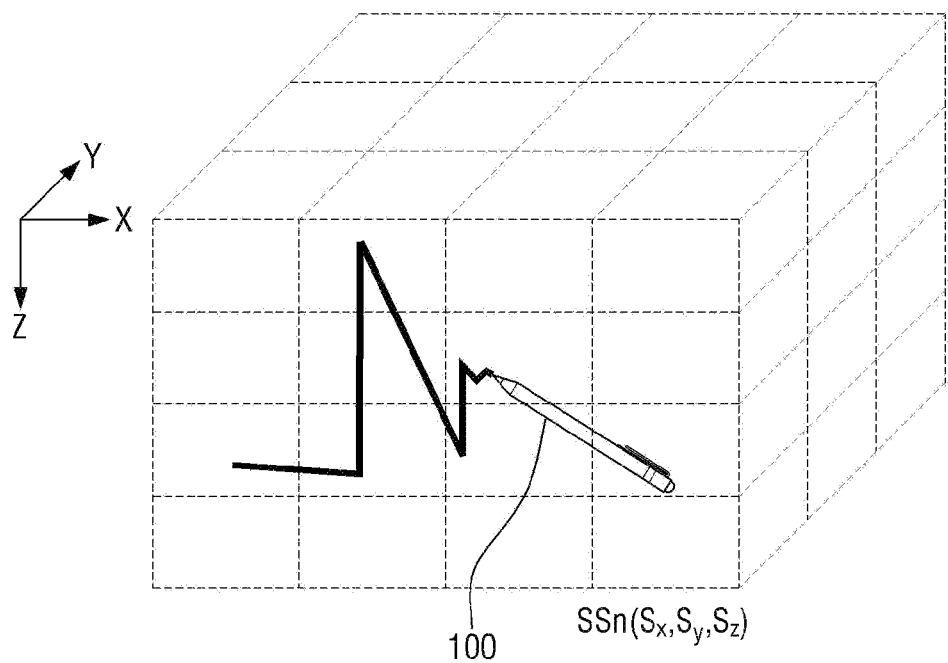
FIG. 19 is a view showing a method for detecting and transmitting a sensing signal by an electronic pen according to some embodiments.

FIG. 18 is a flowchart for illustrating a method for inserting moving path data of an electronic pen and displaying augmented reality contents according to some embodiments of the present disclosure. FIG. 19 is a view showing a method for detecting and transmitting a motion-sensing signal of an electronic pen according to some embodiments.

Initially, referring to FIGS. 18 and 19, the electronic pen 100 generates an acceleration signal, an angular velocity signal, a tilt signal, etc. that vary in real time depending on the distance moving in the x-axis, y-axis, and z-axis directions, speed, and tilt using the acceleration sensor 113, the gyro sensor 115, and the tilt sensor 117, and transmits them.

Accordingly, the location-information-calculating unit 223 may continuously calculate the x-axis coordinate, the y-axis coordinate, and the z-axis coordinate SSn(Sx, Sy, Sz) information of the electronic pen 100 in a coordinate writing space data (e.g., a predetermined coordinate writing space data) SSn based on changes in the distance, speed, and tilt of the electronic pen 100 moving in the x-axis, the y-axis, and the z-axis directions (operation S161 of FIG. 18).

Figure 20:
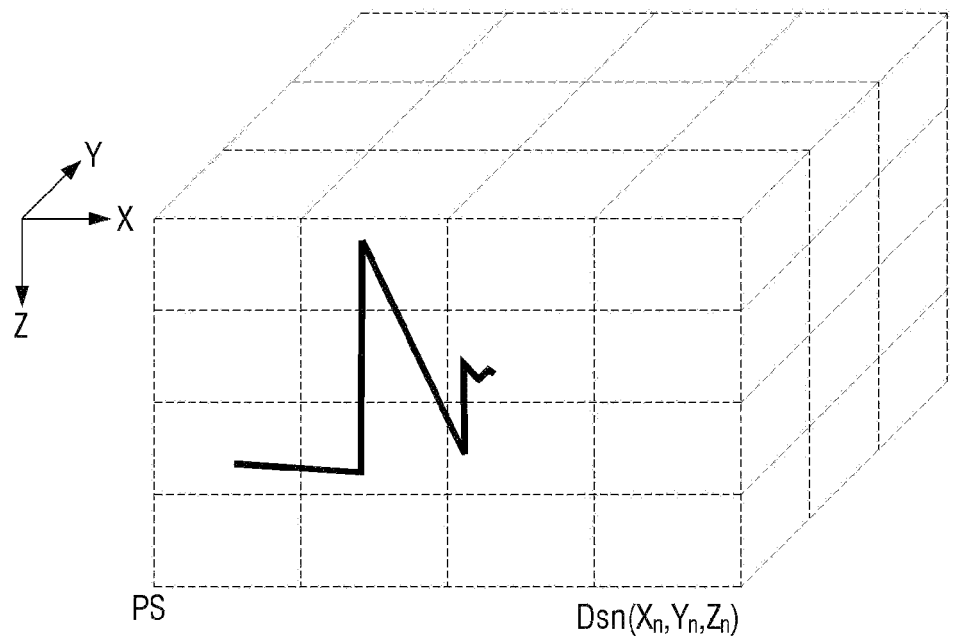
FIG. 20 is a view showing a method for generating coordinate information of an electronic pen according to some embodiments of the present disclosure.
Figure 21:
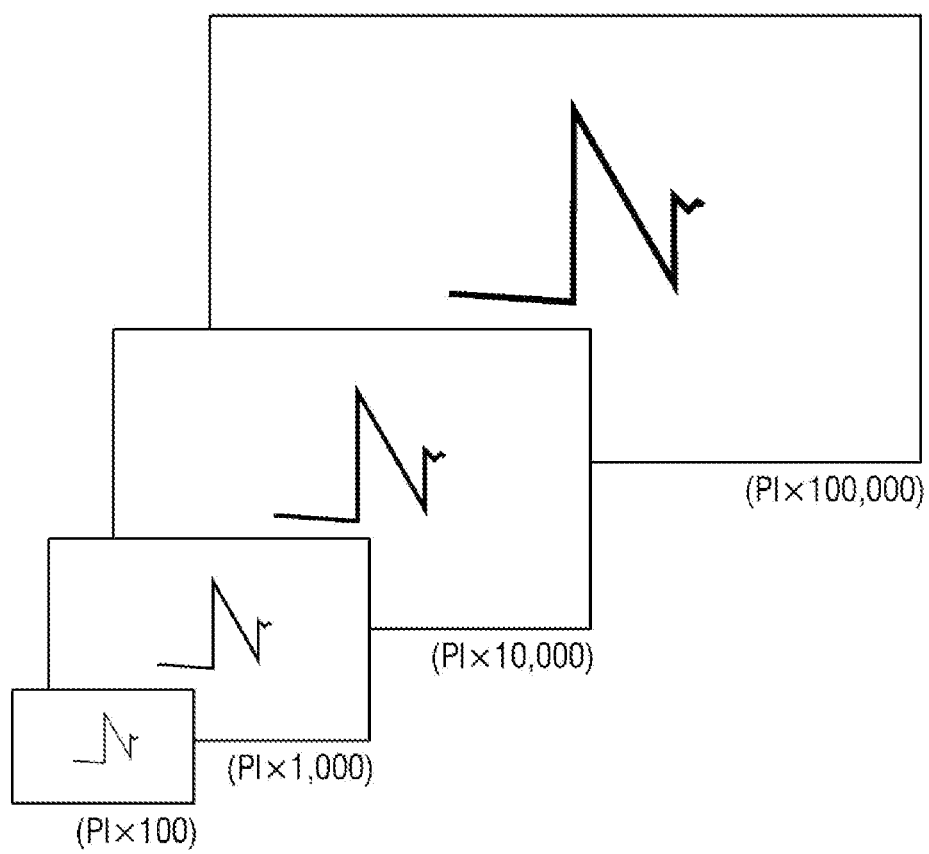
FIG. 21 is a view showing a method for generating moving path data of an electronic pen and a method for modulating data size according to some embodiments of the present disclosure.

FIG. 20 is a view showing a method for generating coordinate information of an electronic pen according to some embodiments of the present disclosure. FIG. 21 is a view showing a method for generating moving path data of an electronic pen, and a method for modulating data size, according to some embodiments of the present disclosure.

Referring to FIG. 20, to match the information of the x-axis coordinate, the y-axis coordinate, and the z-axis coordinate SSn(Sx, Sy, Sz) of the electronic pen 100 with the size information of the augmented reality contents, the image-processing unit 226 continuously stores the information of the x-axis coordinate, the y-axis coordinate, and the z-axis coordinate (SSn(Sx, Sy, Sz)) of the electronic pen 100 in the block data Dsn of the augmented reality contents size, to generate the moving path data Dsn(Xn, Yn, Zn) of the electronic pen 100 (operation S162 of FIG. 18).

Referring to FIG. 21, to match the moving path data Dsn(Xn, Yn, Zn) of the electronic pen 100 with characteristics, such as resolution and frame frequency of the augmented reality contents, the image-processing unit 226 corrects the size, resolution, etc. of the moving path data Dsn(Xn, Yn, Zn) of the electronic pen 100 according to characteristics such as the size and resolution (e.g., PI×10, 000) for each frame of the augmented reality contents data (operation S163 of FIG. 18). Then, the moving path data Dsn(Xn, Yn, Zn) of the electronic pen 100 is stored in the memory 228, etc. (operation S164 of FIG. 18).

Figure 22:
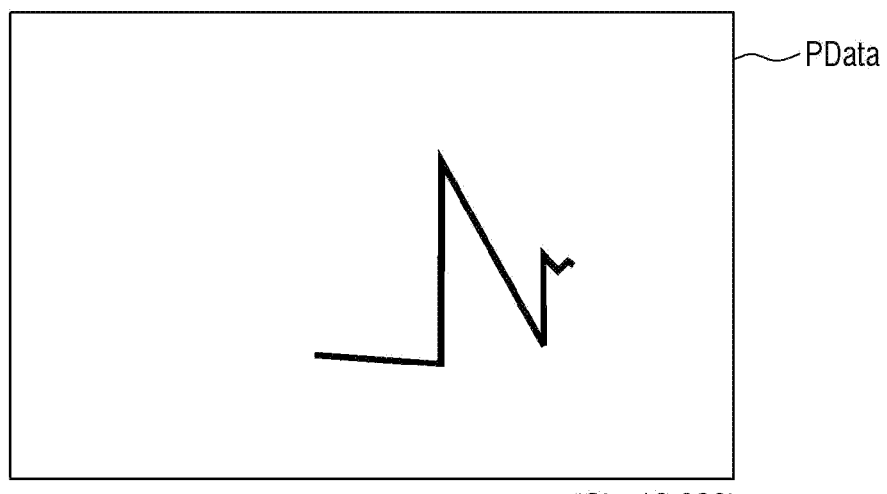
FIG. 22 is a view showing a method for matching moving path data of an electronic pen with augmented reality contents according to some embodiments.
Figure 22:
Figure 22:
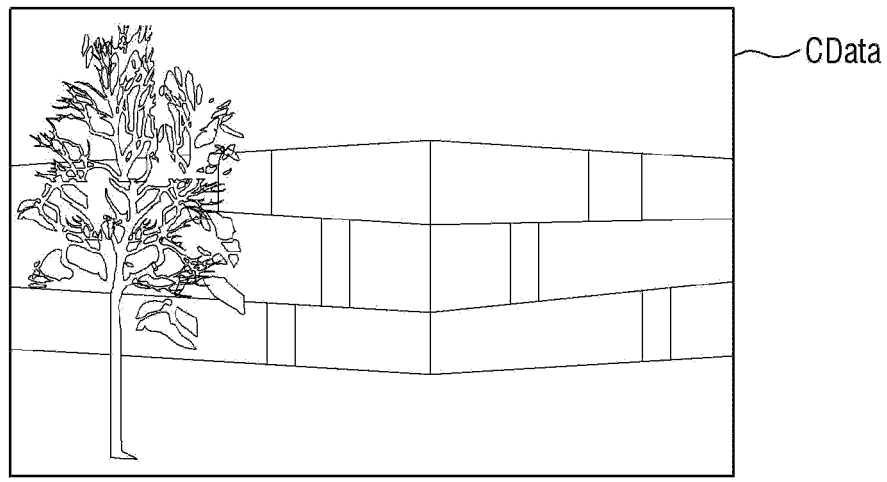
Figure 23:
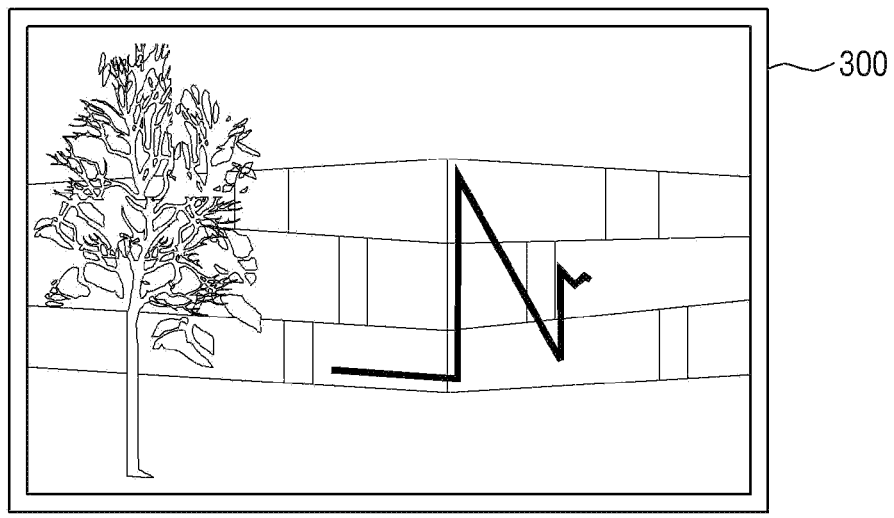
FIG. 23 is a view showing a screen on which augmented reality contents are displayed by matching the moving path data of the electronic pen with the augmented reality contents according to some embodiments.

FIG. 22 is a view showing a method for matching moving path data of an electronic pen with augmented reality contents according to some embodiments. FIG. 23 is a view showing a screen on which augmented reality contents are displayed by matching the moving path data of the electronic pen with the augmented reality contents according to some embodiments.

Referring to FIGS. 22 and 23, the data-correcting unit 224 divides the augmented reality content data frame by frame to store the data (operation S165 of FIG. 18). In addition, the moving path data Dsn(Xn, Yn, Zn)) of the electronic pen 100 in which characteristics such as size and resolution (e.g., PI×10,000) have been modulated is sequentially written into the augmented reality contents data items divided frame by frame, to modulate the augmented reality contents data (operation S166 in FIG. 18).

When the augmented reality contents data items are modulated so that the moving path data Dsn (Xn, Yn, Zn) of the electronic pen 100 are written, the image display control unit 227 may control the at least one display module 210 so that the modulated augmented reality contents data is displayed. At this time, the augmented reality contents data items in which the moving path data items of the electronic pen 100 are written are shared by the at least one contents display device 300 on the outside (operation S170 of FIG. 12). Accordingly, the at least one contents display device 300 may display the augmented reality contents in which the moving path data items of the electronic pen 100 are written, in the same manner as the modulated augmented reality contents on the AR device 200 (operation S180 of FIG. 12).

In concluding the detailed description, those skilled in the art will appreciate that many variations and modifications can be made to the embodiments without substantially departing from the aspects of the present disclosure. Therefore, the disclosed embodiments of the disclosure are used in a generic and descriptive sense only and not for purposes of limitation.

What is claimed is:

1. An augmented reality device comprising:
   at least one transparent lens;
   a support frame supporting the at least one transparent lens;
   at least one display module configured to display augmented reality contents through the at least one transparent lens;
   a sensing module at a front of the support frame, and configured to generate image data; and
   a control module configured to receive motion-sensing signals of an electronic pen to detect motion information of the electronic pen, and configured to modulate the augmented reality contents so that the motion information of the electronic pen is comprised therein, the control module comprising an image-processing unit configured to detect a period of time in which a user gazes at the electronic pen, and configured to generate moving path data of the electronic pen by connecting location coordinate information pieces of the electronic pen.

2. The device of claim 1, wherein the at least one display module is assembled on at least one side of the support frame, or is formed integrally with the support frame, and is configured to display an image of the augmented reality contents through an image transmission member and at least one reflective member of the transparent lens.

3. The device of claim 1, wherein the sensing module is assembled on the support frame, or is formed integrally with the support frame, is configured to detect a distance to an object using a depth sensor and an image sensor, and is configured to detect a user's eye or pupil movement using at least one biosensor.

4. An augmented reality device comprising:
   at least one transparent lens;
   a support frame supporting the at least one transparent lens;
   at least one display module configured to display augmented reality contents through the at least one transparent lens;
   a sensing module at a front of the support frame, and configured to generate image data; and
   a control module configured to receive motion-sensing signals of an electronic pen to detect motion information of the electronic pen, and configured to modulate the augmented reality contents so that the motion information of the electronic pen is comprised therein,
   wherein the sensing module is assembled on the support frame, or formed integrally with the support frame, is configured to detect a distance to an object using a depth sensor and an image sensor, and is configured to detect a user's eye or pupil movement using at least one biosensor,
   wherein the control module is configured to divide the image data in front of the sensing module into block areas, and is configured to identify coordinates of a user's gaze point based on analysis results of pupil-sensing signals of the at least one biosensor, and
   wherein the control module is configured to detect the electronic pen in an image of the block areas associated with the coordinates of the user's gaze point to transmit a drawing start signal to the electronic pen.

5. The device of claim 4, wherein the control module is configured to supply augmented reality contents data to the at least one display module so that the at least one display module displays an image of the augmented reality contents, and upon receiving the motion-sensing signals from the electronic pen in response to the drawing start signal, is configured to modulate the augmented reality contents data so that the motion information of the electronic pen is superimposed on the image of the augmented reality contents.

6. The device of claim 5, wherein the control module is configured to analyze the motion-sensing signals of the electronic pen to calculate location coordinate information of the electronic pen, and is configured to generate moving path data of the electronic pen by connecting the location coordinate information of the electronic pen, and
   wherein the control module is configured to write the moving path data of the electronic pen into the augmented reality contents data to modulate the augmented reality contents data, and is configured to transmit the augmented reality contents data to the at least one display module and to at least one contents display device.

7. The device of claim 6, wherein the at least one contents display device is configured to display the augmented reality contents data shared from the control module on a screen, and is configured to display the augmented reality contents data substantially concurrently with the at least one display module upon receiving the modulated augmented reality contents data.

8. The device of claim 1, wherein the electronic pen comprises:
   a housing in a form of a writing tool;
   a motion detection module in the housing and configured to generate the motion-sensing signals;

at least one interface module configured to generate a drawing start signal or a drawing stop signal according to user input information; and a short-range communications module configured to transmit the motion-sensing signals via wireless communications, or configured to receive the drawing start signal or the drawing stop signal through the control module.

9. The device of claim 1, wherein the control module comprises:
a first wireless communications unit configured to receive the motion-sensing signals from the electronic pen, and configured to transmit a drawing start signal to the electronic pen;
a location-information-calculating unit configured to calculate the location coordinate information pieces of the electronic pen using the motion-sensing signals;
a data-correcting unit configured to modulate augmented reality contents data corresponding to the augmented reality contents to include the moving path data therein;
an image display control unit configured to control the at least one display module so that the augmented reality contents data is displayed through the at least one display module and the transparent lens; and
a second wireless communications unit configured to transmit the augmented reality contents data to at least one external contents display device.

10. The device of claim 9, wherein the location-information-calculating unit is configured to receive the motion-sensing signals comprising an acceleration signal, an angular velocity signal, and a tilt signal that vary as the electronic pen moves in an x-axis direction, a y-axis direction, and a z-axis direction, and is configured to calculate an x-axis coordinate, a y-axis coordinate, and a z-axis coordinate according to changes in distance, speed, and tilt of the electronic pen.

11. The device of claim 9, wherein the image-processing unit is configured to divide the image data corresponding to a front side of the sensing module into block areas, and is configured to detect coordinates of a user's gaze point based on matrix arrangement information of infrared sensors comprised in the sensing module and based on movement analysis results of pupil-sensing signals according to the matrix arrangement information, and
wherein the image-processing unit detects the electronic pen in an image of block areas among the block areas associated with coordinates of the user's gaze point to transmit the drawing start signal to the electronic pen through the first wireless communications unit.

12. The device of claim 11, wherein the image-processing unit is configured to detect an image of a shape of the electronic pen based on at least one of results of analyzing a grayscale or luminance difference between pixels of respective ones of the block areas associated with the coordinates of the user's gaze point, and based on comparing pixel data with a mask in a form of the electronic pen.

13. The device of claim 11, wherein the image-processing unit is configured to calculate distance information between the sensing module and the electronic pen based on a distance-sensing signal from the sensing module when the electronic pen is detected in the image of the block areas, and is configured to transmit the drawing start signal to the electronic pen through the first wireless communications unit when the distance information indicating a distance between the sensing module and the electronic pen is less than or equal to reference distance information.

14. The device of claim 9, wherein the image-processing unit stores an x-axis coordinate, a y-axis coordinate, and a z-axis coordinate of the electronic pen calculated from the location-information-calculating unit in coordinate writing space data or block data of a size of the augmented reality contents to thereby generate the moving path data of the electronic pen.

15. The device of claim 10, wherein the image-processing unit is configured to correct a size and a resolution of the moving path data of the electronic pen so as to correspond to size and resolution characteristics of each frame of the augmented reality contents data, and is configured to transmit the size and the resolution to the data-correcting unit.

16. The device of claim 15, wherein the data-correcting unit is configured to separately store the augmented reality contents data frame by frame, and is configured to sequentially write the moving path data of the electronic pen with modulated size and resolution characteristics into augmented reality contents data items to modulate the augmented reality contents data.

17. A method for providing augmented reality, the method comprising:
displaying augmented reality contents through at least one display module and a transparent lens;
generating a drawing start signal by:
dividing image data into block areas;
detecting an electronic pen in an image of one or more of the block areas associated with coordinates of a user's gaze point;
transmitting the drawing start signal to the electronic pen;
receiving motion-sensing signals from the electronic pen;
calculating location coordinate information pieces of the electronic pen using the motion-sensing signals;
generating moving path data of the electronic pen by connecting the location coordinate information pieces;
modulating augmented reality contents data corresponding to the augmented reality contents so that the moving path data is comprised therein;
displaying the augmented reality contents data on the at least one display module; and
transmitting the augmented reality contents data to at least one external contents display device.

18. The method for claim 17, wherein the generating the drawing start signal comprises:
detecting the image data in front of a device;
detecting the coordinates of the user's gaze point based on matrix arrangement information of infrared sensors comprised in at least one biosensor for detecting a pupil, and based on results of analyzing movement of pupil-sensing signals according to the matrix arrangement information; and
transmitting the drawing start signal to the electronic pen.

19. The method of claim 17, wherein the generating the moving path data of the electronic pen comprises:
storing an x-axis coordinate, a y-axis coordinate, and a z-axis coordinate of the electronic pen in coordinate writing space data or block data of a size of the augmented reality contents; and
correcting a size and a resolution of a moving path data of the electronic pen in which the x-axis coordinate, the y-axis coordinate, and the z-axis coordinate of the electronic pen are arranged to correspond to size and resolution characteristics of each frame of the augmented reality contents.

20. The method of claim 19, wherein the modulating the augmented reality contents data comprises:

dividing and storing the augmented reality contents data frame by frame;

storing the moving path data of the electronic pen in which the size and resolution characteristics are modulated; and sequentially writing, modulating, and storing the moving path data of the electronic pen with the size and the resolution characteristics modulated into the augmented reality contents data.

* * * * *

UNITED STATES PATENT AND TRADEMARK OFFICE
CERTIFICATE OF CORRECTION

PATENT NO. : 11,947,744 B2
APPLICATION NO. : 17/870723
DATED : April 2, 2024
INVENTOR(S) : Tae Hee Lee et al.

Page 1 of 1

It is certified that error appears in the above-identified patent and that said Letters Patent is hereby corrected as shown below:

In the Claims

In Column 32, Line 44, in Claim 18, delete "method for" and insert -- method of --

Signed and Sealed this
Twentieth Day of May, 2025

Coke Morgan Stewart
*Acting Director of the United States Patent and Trademark Office*